(12) United States Patent
Saimen

(10) Patent No.: US 8,391,020 B2
(45) Date of Patent: Mar. 5, 2013

(54) ELECTRO-OPTICAL DEVICE, ELECTRO-OPTICAL PANEL, AND ELECTRONIC APPARATUS

(75) Inventor: Munehide Saimen, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 12/958,154

(22) Filed: Dec. 1, 2010

(65) Prior Publication Data

US 2011/0134621 A1 Jun. 9, 2011

(30) Foreign Application Priority Data

Dec. 3, 2009 (JP) ................................. 2009-275218
Sep. 27, 2010 (JP) ................................. 2010-214838

(51) Int. Cl.
*H05K 1/11* (2006.01)
(52) U.S. Cl. ..................................................... 361/803
(58) Field of Classification Search .................. 361/749, 361/752, 761, 803, 679.01, 704, 707; 174/257, 174/260, 262
See application file for complete search history.

(56) References Cited

FOREIGN PATENT DOCUMENTS

JP 11295747 A 10/1999

*Primary Examiner* — Jeremy Norris
*Assistant Examiner* — Tremesha S Willis
(74) *Attorney, Agent, or Firm* — Loew Hauptman Ham & Berner LLP

(57) ABSTRACT

Disclosed herein is an electro-optical device including: an electro-optical panel including a first terminal portion having a first terminal and a second terminal and a second terminal portion having a third terminal and a fourth terminal, the first and the fourth terminal being electrically connected through a first connection wiring, the second and the third terminal being electrically connected through a second connection wiring; a first circuit substrate having a first external terminal connected to the first terminal and a second external terminal connected to the second terminal through a first connection terminal portion respectively; and a second circuit substrate having a third external terminal connected to the third terminal and a fourth external terminal connected to the fourth terminal through a second connection terminal portion respectively.

13 Claims, 19 Drawing Sheets

ELECTRO-OPTICAL DEVICE, ELECTRO-OPTICAL PANEL, AND ELECTRONIC APPARATUS

BACKGROUND

1. Technical Field

The present invention relates to an electro-optical device, an electro-optical panel, and an electronic apparatus.

2. Related Art

A liquid crystal device which is an electro-optical device includes a relay substrate for transferring a signal to a liquid crystal panel between the liquid crystal panel having a display region and an external driving circuit. As a representative example of a method of electrically connecting a liquid crystal panel and a relay substrate, JP-A-11-295747 discloses a method of providing connection terminals to a liquid crystal panel and a flexible substrate (Flexible Printed Circuits (FPC)) as a relay substrate and pressing the connection terminals with Anisotropic Conductive Film (ACF) interposed therebetween so as to electrically connect conductive particles configuring the ACF and connection terminals by contact.

As a method of inspecting whether the liquid crystal panel and the flexible substrate are electrically connected, in the related art, particle marks of the conductive particles formed in the connection terminals during pressing are checked. The conductive particles are, for example, metal balls of nickel. However, recently, for example, plastic balls plated with metal using the characteristics of an elastic body are used as a material for the conductive particles.

However, the plastic ball is an elastic body. In addition, since the conductive particles are broken during pressure bonding, the particle marks are not formed in the connection terminals. Accordingly, unless the connection terminals can be seen through, there is no method of checking whether or not the connection terminals are electrically connected to each other when the connection terminal of the flexible substrate is adhered to the connection terminal of the liquid crystal panel. That is, there is no method of simply checking electrical reliability, other than recognizing a display state such that the liquid crystal panel is actually driven.

SUMMARY

An advantage of some aspects of the invention is that it is possible to realize the following application examples.

Application 1

According to an application of the invention, there is provided an electro-optical device including: an electro-optical panel including a first terminal portion having a plurality of terminals and a second terminal portion having a plurality of terminals so as to be adjacent to the first terminal portion; and a first circuit substrate on which a first connection terminal portion having a plurality of connection terminals to be electrically connected to the first terminal portion is provided and a second circuit substrate on which a second connection terminal portion having a plurality of connection terminals to be electrically connected to the second terminal portion is provided, wherein the first terminal portion has first and second terminals separated from each other, the second terminal portion has third and fourth terminals separated from each other, and the first terminal and the fourth terminal, and the second terminal and the third terminal are electrically connected through a first connection wiring and a second connection wiring provided on the electro-optical panel, respectively, the first circuit substrate has a first external terminal connected to the first terminal and a second external terminal connected to the second terminal through the first connection terminal portion, and the second circuit substrate has a third external terminal connected to the third terminal through the second connection terminal portion and a fourth external terminal connected to the fourth terminal.

By this configuration, even when the first terminal portion and the second terminal portion are arranged so as to be adjacent to each other, the first terminal and the fourth terminal, and the second terminal and the third terminal are electrically connected between the first terminal portion and the second terminal portion, it is possible to inspect whether or not each of the connection portions are electrically connected using the first external terminal to the fourth external terminal extracted through the first connection terminal portion and the second connection terminal portion. That is, by checking the connection state through the circuit substrate, it is possible to detect whether or not the electro-optical panel and the circuit substrates are electrically connected.

Application 2

In the electro-optical device of the above application, some of the first connection wiring and the second connection wiring may be arranged so as to be extended around the circumference of a display region.

By this configuration, since the first terminal and the fourth terminal or the second terminal and the third terminal are connected through the connection wiring extended around the circumference of the display region, it is possible to check the connection without contact between the first terminal portion and the second terminal portion and the wiring for connecting the elements in the display region. In addition, the same effect can be achieved even when a layer for avoiding contact with the wiring is not formed on the liquid crystal panel.

Application 3

In the electro-optical device of the above application, the plurality of terminals may configure a terminal group arranged in a predetermined direction, and the first terminal and the second terminal, and the third terminal and the fourth terminal may be provided at both end sides of the predetermined direction of the terminal group.

By this configuration, if linear expansion coefficients of the electro-optical panel and the circuit substrate are different, warpage is prone to occur in both ends of the terminal group. However, since the connection state of the first terminal to the fourth terminal provided at both ends of each terminal group is checked, it is possible to check the connection state of all the connection portions.

Application 4

In the electro-optical device of the above application, the first terminal portion and the second terminal portion may be provided on at least one of either a first side of the electro-optical panel and a second side of a direction crossing the first side.

By this configuration, even when the first terminal portion or the second terminal portion is provided along the first side or the second side of the electro-optical panel, the first terminal and the fourth terminal, and the second terminal and the third terminal in the first terminal portion and the second terminal portion are electrically connected, it is possible to detect whether or not the terminal portions and the connection terminal portions are electrically connected.

Application 5

In the electro-optical device of the above application, the electro-optical panel may include a third terminal portion having a plurality of terminals, a fourth terminal portion having a plurality of terminals arranged so as to be adjacent to the third terminal portion, a third circuit substrate on which a third connection terminal portion having a plurality of connection terminals to be electrically connected to the third terminal portion is provided, and a fourth circuit substrate on which a fourth connection terminal portion having a plurality of connection terminals to be electrically connected to the fourth terminal portion is provided, the third terminal portion may be provided between a position where the first terminal portion is provided and an end of the electro-optical panel, and the fourth terminal portion is provided between a position where the second terminal portion is provided and an end of the electro-optical panel, the third terminal portion has fifth and sixth terminals separated from each other, the fourth terminal portion has seventh and eighth terminals separated from each other, and the fifth terminal and the eighth terminal, and the sixth terminal and the seventh terminal are electrically connected through a third connection wiring and a fourth connection wiring provided on the electro-optical panel, respectively, the third circuit substrate may have a fifth external terminal connected to the fifth terminal through the third connection terminal portion and a sixth external terminal connected to the sixth terminal, and the fourth circuit substrate may have a seventh external terminal connected to the seventh terminal through the fourth connection terminal portion and an eighth external terminal connected to the eighth terminal.

By this configuration, even when the third terminal portion and the fourth terminal portion are arranged between the first terminal portion and the second terminal portion and the end of the electro-optical panel, since the fifth terminal and the eighth terminal, and the sixth terminal and the seventh terminal respectively separated therefrom are electrically connected, it is possible to inspect whether or not each of the connection portions are electrically connected using the external terminals (the fifth external terminal to the eighth external terminal) through the third connection terminal portion and the fourth connection terminal portion. That is, it is possible to detect whether or not the electro-optical panel and each of the circuit substrates are electrically connected, by checking the connection state through the circuit substrates.

Application 6

In the electro-optical device of the above application, the third connection wiring may be extended around the circumference of the display region.

By this configuration, since the first terminal and the second terminal and the fifth terminal and the sixth terminal are connected through the third connection wiring, extended around the circumference of the display region, it is possible to check the connection without contact between the first terminal portion and the third terminal portion and the wiring for connecting the elements in the display region. In addition, the same effect can be achieved even when a layer for avoiding contact with the wiring is not formed on the electro-optical panel.

Application 7

In the electro-optical device of the above application, the plurality of terminals may configure a terminal group arranged in a predetermined direction, and the fifth terminal and the sixth terminal, and the seventh terminal and the eighth terminal may be provided at both end sides in the predetermined direction of the terminal group.

By this configuration, if linear expansion coefficients of the electro-optical panel and the circuit substrate are different, warpage is prone to occur at both ends of the terminal group. However, since the connection state of the fifth terminal, the sixth terminal, the seventh terminal and the eighth terminal provided at both ends of each terminal group is checked, it is possible to check the connection state of all the connection portions.

Application 8

According to another application of the invention, there is provided an electro-optical device including: an electro-optical panel including a first terminal portion having a plurality of terminals and a third terminal portion having a plurality of terminals arranged on a side opposed to a display region with respect to the first terminal portion; and a first circuit substrate on which a first connection terminal portion having a plurality of connection terminals to be electrically connected to the first terminal portion is provided and a third circuit substrate on which a third connection terminal portion having a plurality of connection terminals to be electrically connected to the third terminal portion is provided, wherein the first terminal portion has first and second terminals separated from each other, the third terminal portion has fifth and sixth terminals separated from each other, and the first terminal and the fifth terminal, and the second terminal and the sixth terminal are electrically connected through a fifth connection wiring and a sixth connection wiring provided on the electro-optical panel, respectively, the first circuit substrate has a first external terminal connected to the first terminal and a second external terminal connected to the second terminal through the first connection terminal portion, and the third circuit substrate has a fifth external terminal connected to the fifth terminal through the third connection terminal portion and a sixth external terminal connected to the sixth terminal.

By this configuration, even when the third terminal portion is arranged on the side opposed to the display region with respect to the first terminal portion, the first terminal and the fifth terminal, and the second terminal and the sixth terminal provided in the same direction are electrically connected through the fifth connection wiring and the sixth connection wiring, so that it is possible to inspect whether or not each of the connection portions are electrically connected using the external terminals extracted through the first connection terminal portion and the third connection terminal portion. That is, by checking the connection state through the circuit substrate, it is possible to detect whether or not the electro-optical panel and each of the circuit substrates are electrically connected.

Application 9

In the electro-optical device of the above application, the fifth connection wiring and the sixth connection wiring may be provided at an end side of the electro-optical panel rather than the display region.

By this configuration, since the connection wirings are provided at the end side of the electro-optical panel, it is possible to check the connection without contact with the wiring connected to the elements in the display region.

Application 10

In the electro-optical device of the above application, the plurality of terminals may configure a terminal group arranged in a predetermined direction, and the first terminal and the second terminal, and the fifth terminal and the sixth terminal may be provided at both end sides in the predetermined direction of the terminal group.

By this configuration, if linear expansion coefficients of the electro-optical panel and the circuit substrate are different, warpage is prone to occur in both ends of the terminal group. However, since the connection state of the first terminal, the fifth terminal, the second terminal and the sixth terminal provided at both ends of each terminal group is checked, it is possible to check the connection state of all the connection portions.

Application 11

According to another application of the invention, there is provided an electro-optical panel including: on a substrate, a first terminal portion having a plurality of terminals including first and second terminals separated from each other; a second terminal portion arranged so as to be adjacent to the first terminal portion and having a plurality of terminals including third and fourth terminals separated from each other; a third terminal portion arranged between one side of the substrate and the first terminal portion and having a plurality of terminals including fifth and sixth terminals separated from each other; a fourth terminal portion arranged between one side of the substrate and the second terminal portion and having a plurality of terminals including seventh and eighth terminals separated from each other; a first connection wiring configured to electrically connect the first terminal and the fourth terminal; a fifth connection wiring configured to electrically connect the first terminal and the fifth terminal; a sixth connection wiring configured to electrically connect the second terminal and the sixth terminal; a seventh connection wiring configured to electrically connect the third terminal and the seventh terminal; an eighth connection wiring configured to electrically connect the fourth terminal and the eighth terminal; and a ninth connection wiring configured to electrically connect the sixth connection wiring and the seventh connection wiring so as to electrically connect the second terminal, the third terminal, the sixth terminal and the seventh terminal.

By this configuration, even when the third terminal portion is arranged on the side opposed to the display region with respect to the first terminal portion and the fourth terminal portion is arranged on the side opposed to the display region with respect to the second terminal portion, the first terminal and the fifth terminal, and the second terminal and the sixth terminal provided in the same direction are electrically connected through the fifth connection wiring and the sixth connection wiring, and the third terminal and the seventh terminal, and the fourth terminal and the eighth terminal are electrically connected through the seventh connection wiring and the eighth connection wiring, it is possible to inspect whether or not each of the connection portions are electrically connected.

Application 12

According to another application of the invention, there is provided an electro-optical device including: the above-described electro-optical panel; a first circuit substrate on which a first connection terminal portion having a plurality of connection terminals to be electrically connected to the first terminal portion is provided and which has a first external terminal connected to the first terminal through the first connection terminal portion and a second external terminal connected to the second terminal; a second circuit substrate on which a second connection terminal portion having a plurality of connection terminals to be electrically connected to the second terminal portion is provided and which has a third external terminal connected to the third terminal through the second connection terminal portion and a fourth external terminal connected to the fourth terminal; a third circuit substrate on which a third connection terminal portion having a plurality of connection terminals to be electrically connected to the third terminal portion is provided and which has a fifth external terminal connected to the fifth terminal through the third connection terminal portion and a sixth external terminal connected to the sixth terminal; and a fourth circuit substrate on which a fourth connection terminal portion having a plurality of connection terminals to be electrically connected to the fourth terminal portion is provided and which has a seventh external terminal connected to the seventh terminal through the fourth connection terminal portion and an eighth external terminal connected to the eighth terminal.

By this configuration, since the terminals and the external terminals are electrically connected through the connection terminal portions, it is possible to inspect whether or not each of the connection portions are electrically connected using the external terminals. That is, it is possible to detect whether or not the electro-optical panel and each of the circuit substrates are electrically connected, by checking the connection state through the circuit substrates.

Application 13

According to another application of the invention, there is provided an electronic apparatus comprising the above-described electro-optical device.

By this configuration, it is possible to provide an electronic apparatus with high reliability in electrical characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the embodiments of the invention will be described with reference to the drawings. In addition, in the used views, the described portions are appropriately scaled up or down so as to be identified. In the present embodiment, for example, a Thin Film Transistor (TFT) active matrix driving type liquid crystal device used as a light valve in a liquid crystal projector which is a projection type imaging device as an example of an electro-optical device.

First Embodiment

Configuration of Liquid Crystal Device

Figure 1:
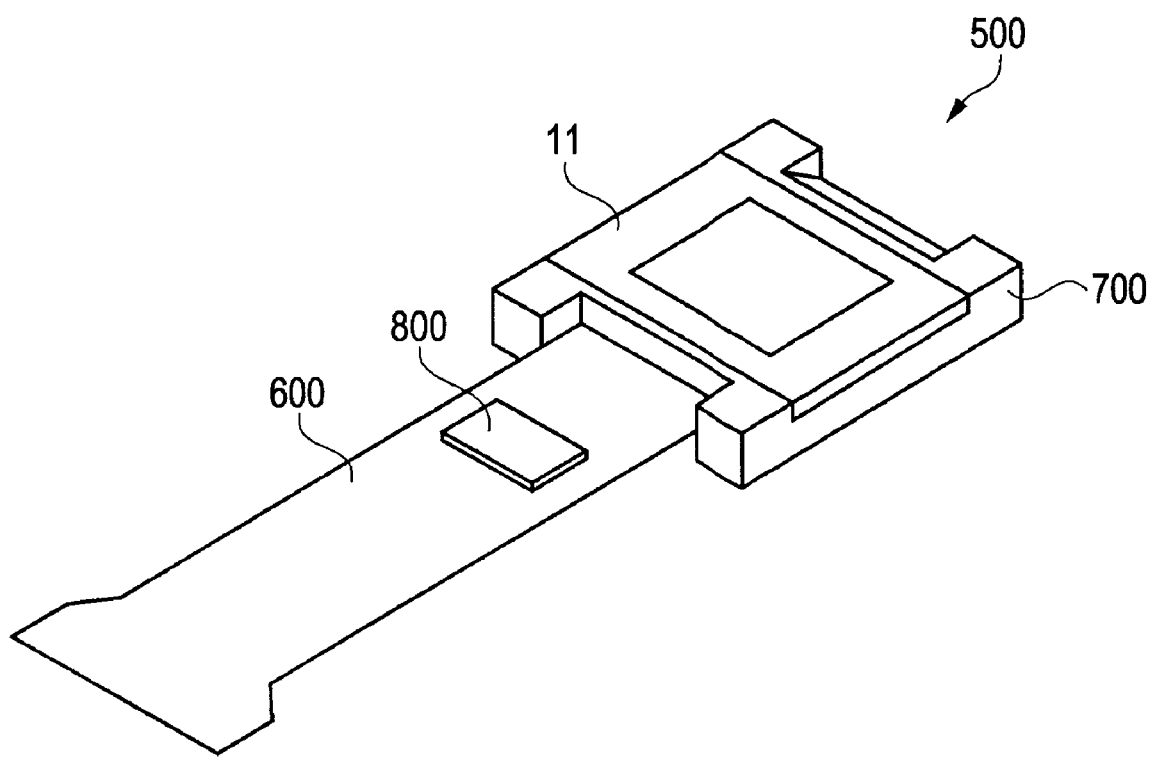
FIG. 1 is a schematic perspective view showing the configuration of a liquid crystal device as an electro-optical device.

FIG. 1 is a schematic perspective view showing the configuration of a liquid crystal device as an electro-optical device. Hereinafter, the configuration of the liquid crystal device will be described with reference to FIG. 1.

As shown in FIG. 1, the liquid crystal device 500 includes a liquid crystal panel 11 as an electro-optical panel, a flexible substrate 600 as a circuit substrate, and a frame 700. In addition, the frame 700 is fixed to the liquid crystal panel 11 by a hook (not shown).

Dust-proof glass (not shown) is adhered to front and rear surfaces of the liquid crystal panel 11. In detail, the dust-proof glass is provided in order to prevent dust or the like from being attached to at least a display region of the liquid crystal panel 11. In addition, for example, a driving IC chip 800 is mounted on the flexible substrate 600.

The driving IC chip 800 includes, for example, a part of a data line driving circuit (not shown). In addition, the driving IC chip 800 is electrically and mechanically mounted on a wiring substrate using Tape Automated Bonding (TAB) technology. The wiring substrate has a base having an insulation property, such as polyimide, and a wiring patterned and formed on the base.

Figure 2:
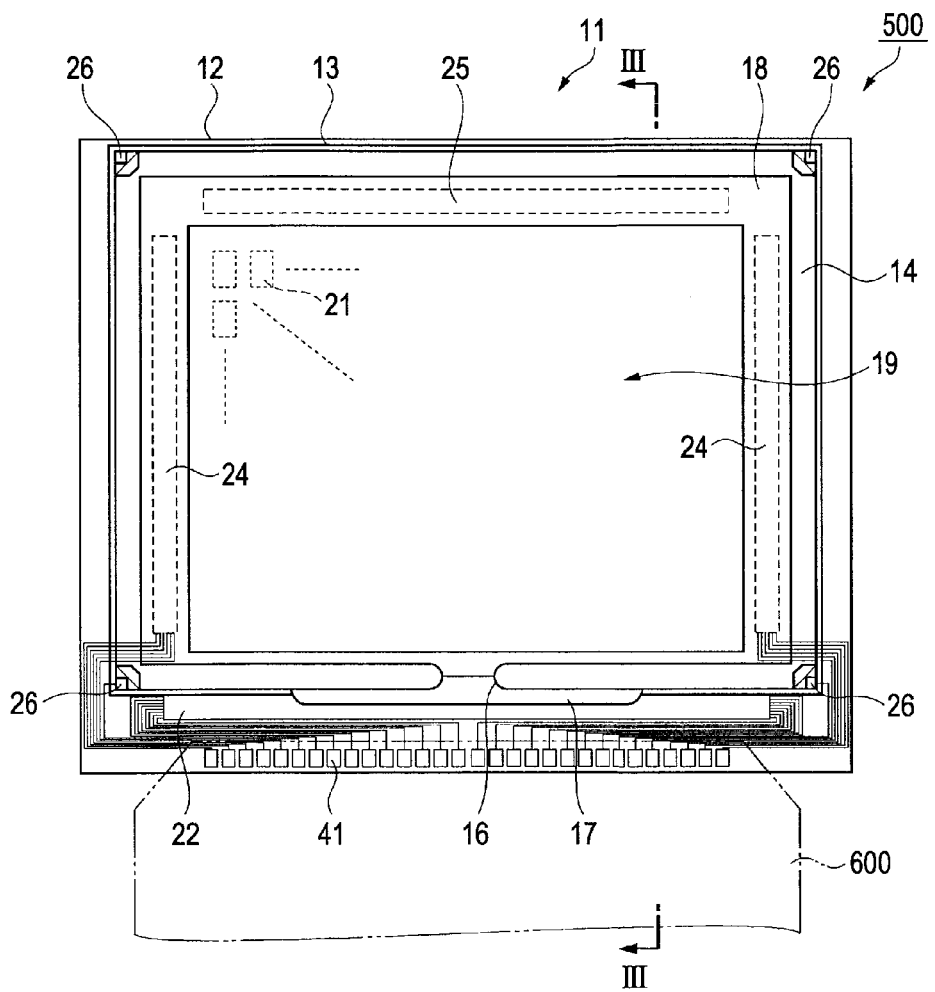
FIG. 2 is a schematic plan view showing the structure of a liquid crystal, panel.
Figure 3:
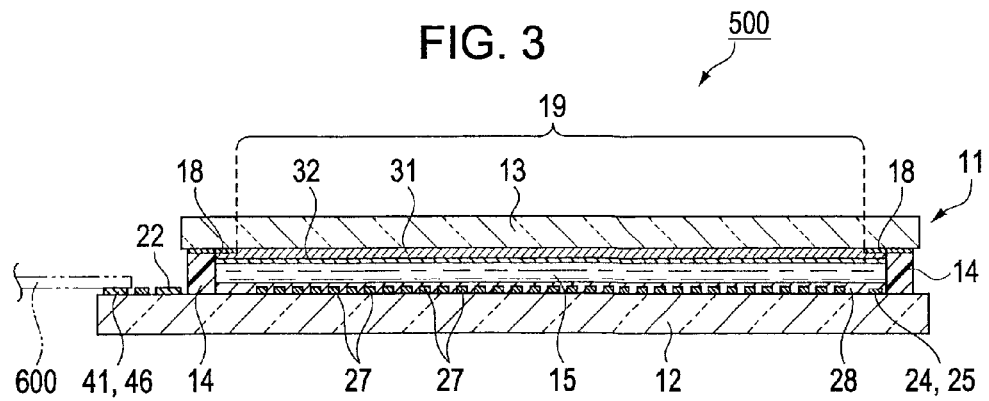
FIG. 3 is a schematic cross-sectional diagram taken along line of the liquid crystal panel shown in FIG. 2.

FIG. 2 is a schematic plan view showing the structure of the liquid crystal panel. FIG. 3 is a schematic cross-sectional diagram taken along line of the liquid crystal panel shown in FIG. 2. Hereinafter, the structure of the liquid crystal device will be described with reference to FIGS. 2 and 3. In addition, FIGS. 2 and 3 show the liquid crystal panel and the flexible substrate together.

As shown in FIGS. 2 and 3, the liquid crystal panel 11 configuring the liquid crystal device 500 is, for example, a TFT active matrix liquid crystal panel using a Thin Film Transistor (hereinafter, referred to as a TFT) as a pixel switching element. The liquid crystal panel 11 is obtained by adhering a device substrate 12 and a counter substrate 13 configuring a pair of substrates by a sealing material 14 having substantially a rectangular shape in plan view.

The device substrate 12 and the counter substrate 13 are formed of, for example, a translucent material such as quartz. In the liquid crystal panel 11, a liquid crystal layer 15 is enclosed in a region surrounded by the sealing material 14. In addition, a liquid crystal injection port 16 for injecting liquid crystal is provided in the sealing material 14 and the liquid crystal injection port 16 is sealed by a sealing material 17.

As the liquid crystal layer 15, for example, a liquid crystal material having positive dielectric anisotropy is used. In the liquid crystal panel, a frame light shielding film 18 formed of a light shielding material and having a substantially rectangular shape in plan view is formed on the counter substrate 13 along the vicinity of an inner circumference of the sealing material 14 and a region located inside the frame light shielding film 18 is a display region 19.

The frame light shielding film 18 is formed of, for example, aluminum (Al) which is a light shielding material, and is provided so as to partition an outer circumference of the display region 19 of the counter substrate 13 side.

In the display region 19, pixel regions 21 are provided in a matrix. Each pixel region 21 configures one pixel which is a minimum display unit of the display region 19. In an outer region of the sealing material 14, a data line driving circuit 22 and a panel connection terminal portion 41 as a first terminal portion are formed along one side (lower side of FIG. 2) of the device substrate 12. The flexible substrate 600 as the circuit substrate for external connection is electrically connected to the panel connection terminal portion 41 through an FPC connection terminal portion 46 as a first connection terminal portion. The connection portion between the liquid crystal panel 11 and the flexible substrate 600 will be described in detail later.

In addition, in the inner region of the sealing material 14, scanning line driving circuits 24 are formed along two sides adjacent to one side. An inspection circuit 25 is formed on the remaining one side (an upper side of FIG. 2) of the device substrate 12. The frame light shielding film 18 formed on the counter substrate 13 side is formed at a position (overlapping position in plan view) facing the scanning line driving circuits 24 and the inspection circuit 25 formed on the device substrate 12.

Vertical connection terminals 26 for electrically connecting the device substrate 12 and the counter substrate 13 are provided on angle portions of the counter substrate 13 (for example, four corner portions of the sealing material 14).

In addition, as shown in FIG. 3, a plurality of pixel electrodes 27 is formed on the liquid crystal layer 15 side of the device substrate 12, and a first alignment film 28 is formed so as to cover the pixel electrodes 27. The pixel electrodes 27 are conductive films formed of a transparent conductive material such as Indium Tin Oxide (ITO).

A lattice-shaped light shielding film (BM: black matrix) (not shown) is formed on the liquid crystal layer 15 side of the counter substrate 13, and a common electrode 31 is solidly formed thereon in plan view. A second alignment film 32 is formed on the common electrode 31. The common electrode 31 is a conductive film formed of a transparent conductive material such as ITO.

The liquid crystal panel 11 is of a transmissive type, and polarization plates (not shown) are disposed on an incident side and an emission side of light of the device substrate 12 and the counter substrate 13. In addition, the configuration of the liquid crystal panel 11 is not limited thereto and may be of a reflective type or a semi-transmissive type.

Figure 4:
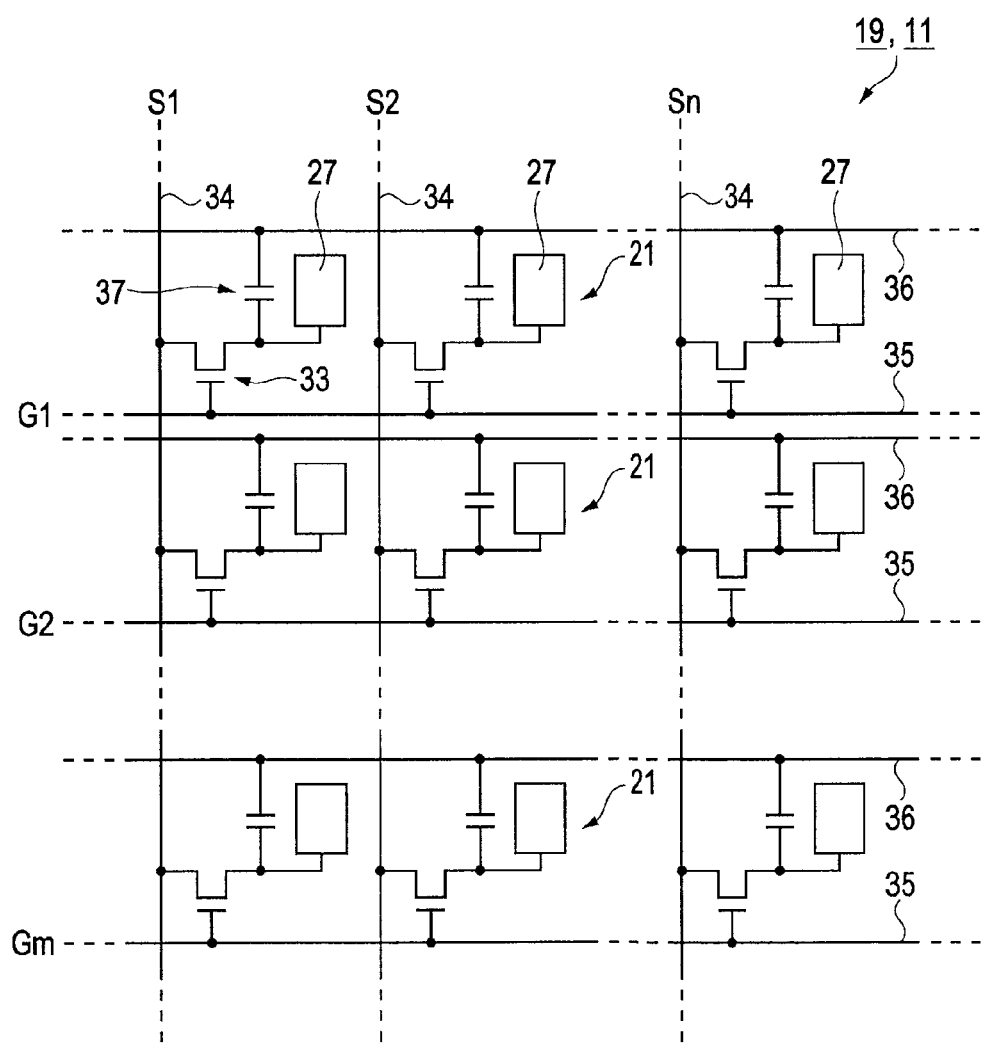
FIG. 4 is an equivalent circuit diagram showing the electrical configuration of the liquid crystal panel.

FIG. 4 is an equivalent circuit diagram showing the electrical configuration of the liquid crystal panel. Hereinafter, the electrical configuration of the liquid crystal panel will be described with reference to FIG. 4.

As shown in FIG. 4, the liquid crystal panel 11 includes the plurality of pixel regions 21 configuring the display region 19. In each pixel region 21, the pixel electrode 27 is formed. In each pixel region 21, a TFT element 33 is formed.

The TFT element 33 is a switching element for controlling the energization of the pixel electrode 27. The data line 34 is electrically connected to the source side of the TFT element 33. For example, the data line driving circuit 22 (see FIG. 2) supplies image signals S1, S2, . . . , and Sn to the data lines 34.

In addition, the scanning line 35 is electrically connected to the gate side of the TFT element 33. For example, the scanning line driving circuit 24 (see FIG. 2) supplies scanning signals G1, G2, ..., and Gm to the scanning lines 35 at predetermined timings in a pulsed manner. The pixel electrode 27 is electrically connected to the drain side of the TFT element 33.

The TFT elements 33 which are the switching elements are turned on only for a predetermined period by the scanning signals G1, G2, ..., and Gm supplied from the scanning lines 35, and the image signals S1, S2, ..., and Sn supplied from the data lines 34 are written in the pixel regions 21 through the pixel electrodes 27 at the predetermined timings.

The image signals S1, S2, ..., and Sn having a predetermined level, which are written in the pixel regions 21, are held for a predetermined period by liquid crystal capacitance formed between the pixel electrodes 27 and the common electrode 31 (see FIG. 3). In addition, in order to prevent the held image signals S1, S2, ..., and Sn from leaking, a storage capacitor 37 is formed between a pixel potential side capacitive electrode electrically connected to each pixel electrode 27 and a capacitive electrode 36 electrically connected to a shield layer 57 (see FIG. 5) which is an example of a capacitive line.

In this way, when a voltage signal is applied to the liquid crystal layer 15, the alignment state of the liquid crystal molecules is changed by the applied voltage level. Thus, the light incident to the liquid crystal layer 15 is modulated so as to generate image light.

Structure of Liquid Crystal Panel

Figure 5:
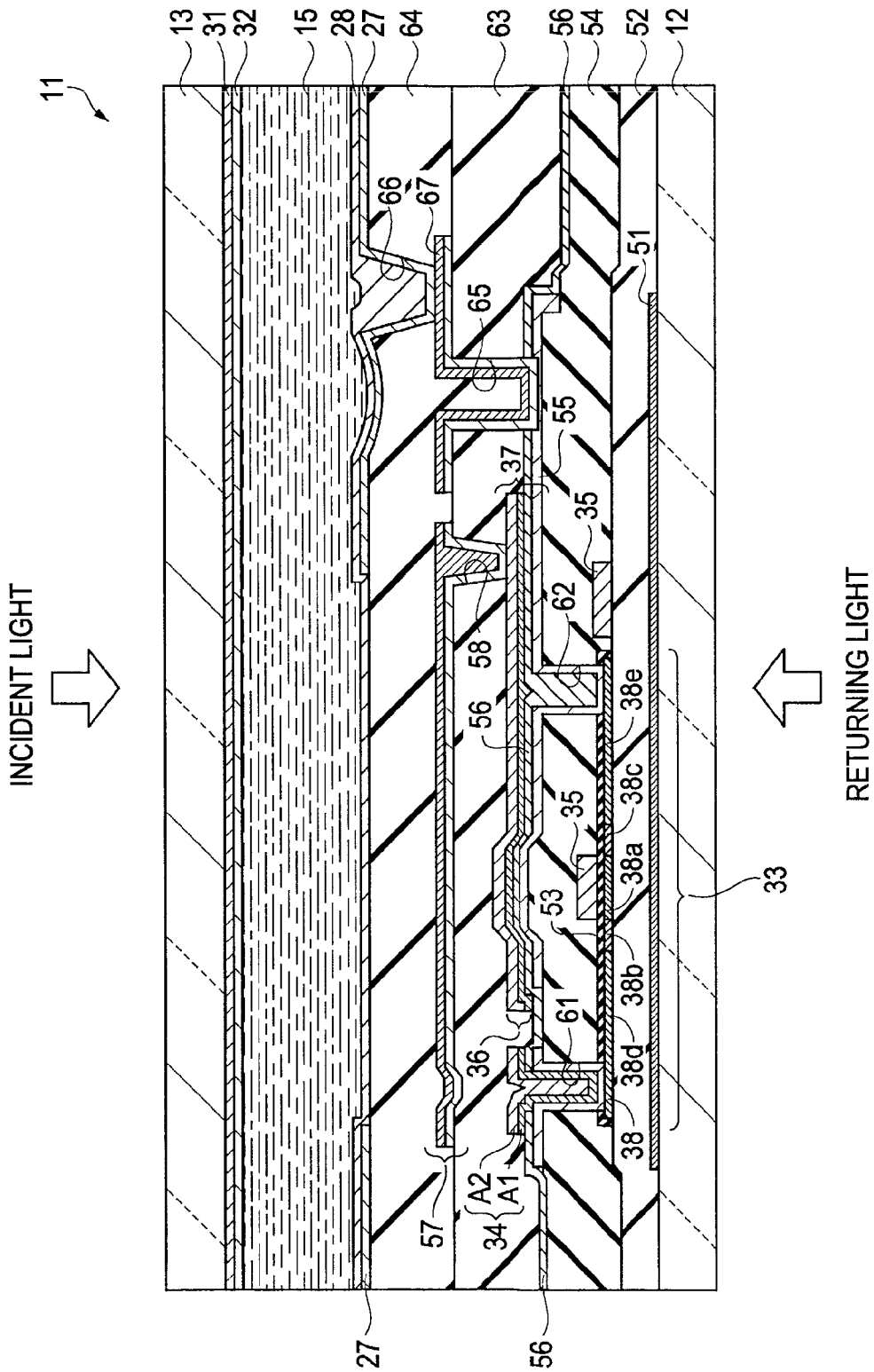
FIG. 5 is a schematic cross-sectional diagram showing the structure of the liquid crystal device.

FIG. 5 is a schematic cross-sectional diagram showing the structure of the liquid crystal device. Hereinafter, the structure of the liquid crystal device will be described with reference to FIG. 5. In addition, FIG. 5 shows the positional relationship among the components in cross-sectional view by an explicit scale.

As shown in FIG. 5, the liquid crystal panel 11 includes the device substrate 12 and the counter substrate 13 facing the device substrate. Each of the device substrate 12 and the counter substrate 13 is formed of, for example, a quartz substrate as described above.

On the device substrate 12, a lower light shielding film 51 formed of titanium (Ti), chrome (Cr), or the like is formed. The lower light shielding film 51 is patterned in a lattice shape in plan view so as to define opened regions of the pixels. An underlying insulating film 52 formed of a silicon oxide film or the like is formed on the device substrate 12 and the lower light shielding film 51.

The TFT element 33, the scanning line 35 and the like are formed on the underlying insulating film 52. The TFT element 33 has, for example, a Lightly Doped Drain (LDD) structure, and includes a semiconductor layer 38 formed of a polysilicon or the like, a gate insulating film 53 formed on the semiconductor layer 38, and the scanning line 35 formed on the gate insulating film 53 and formed of a polysilicon film or the like. As described above, the scanning line 35 functions as the gate electrode.

The semiconductor layer 38 includes a channel region 38a, a low-concentration source region 38b, a low-concentration drain region 38c, a high-concentration source region 38d, and a high-concentration drain region 38e. In the channel region 38a, a channel is formed by an electric field from the scanning line 35. A first interlayer insulating layer 54 formed of a silicon oxide film or the like is formed on the underlying insulating film 52.

The storage capacitor 37, the data line 34, and the like are provided on the first interlayer insulating film 54. In the storage capacitor 37, a relay layer 55 as the pixel potential side capacitive electrode connected to the high-concentration drain region 38e of the TFT element 33 and the pixel electrode 27 and the capacitive electrode 36 as a fixed potential side capacitive electrode face each other with a dielectric film 56 interposed therebetween.

The capacitive electrode 36 and the data line 34 are formed as a film having a two-layer structure including a conductive polysilicon film A1 as a lower layer and an aluminum film A2 as an upper layer.

The capacitive electrode 36 and the data line 34 include aluminum with relatively high light reflection performance and include polysilicon with relatively excellent light absorption performance, thereby functioning as a light shielding layer. Accordingly, it is possible to block in advance the incident light relating to the semiconductor layer 38 of the TFT element 33 at the upper side thereof.

The capacitive electrode 36 functions as a fixed potential side capacitive electrode of the storage capacitor 37. In order to set the capacitive electrode 36 to the fixed potential, as described above, the capacitive electrode is connected to a constant potential source other than the pixel region 21 so as to be electrically connected to a shield layer 57 with a fixed potential through a contact hole 58.

A contact hole 61 for electrically connecting the high-concentration source region 38d of the TFT element 33 and the data line 34 is formed in the first interlayer insulating film 54. In other words, the data line 34 is electrically connected to the semiconductor layer 38 of the TFT element 33 through the contact hole 61 penetrating through the dielectric film 56 and the first interlayer insulating film 54. In detail, the data line 34 employs the above-described two-layer structure, and the relay layer 55 is formed of a conductive polysilicon film such that the electrical connection between the data line 34 and the semiconductor layer 38 is realized by a conductive polysilicon film. That is, the semiconductor layer 38, the polysilicon film of the relay layer 55, and the polysilicon film A1 of the lower layer and the aluminum film A2 of the upper layer of the data line 34 are sequentially formed from the bottom.

In addition, a contact hole 62 for electrically connecting the high-concentration drain region 38e of the TFT element 33 and the relay layer 55 configuring the storage capacitor 37 is formed in the first interlayer insulating film 54. A second interlayer insulating film 63 formed of a silicon oxide film or the like is formed on the first interlayer insulating film 54.

For example, the shield layer 57 formed of aluminum or the like is formed on the second interlayer insulating film 63. In addition, a contact hole 58 for electrically connecting the shield layer 57 and the capacitive electrode 36 is formed in the second interlayer insulating film 63 as described above. A third interlayer insulating film 64 formed of a silicon oxide film or the like is formed on the second interlayer insulating film 63.

Contact holes 65 and 66 for electrically connecting the pixel electrode 27 and the relay layer 55 are formed in the second interlayer insulating film 63 and the third interlayer insulating film 64. In detail, the contact hole 65 and a contact hole 66 are electrically connected through a second relay layer 67 formed on the second interlayer insulating film 63. The second relay layer 67 has the same film configuration as the shield layer 57 and has a two-layer structure including an aluminum film as a lower layer and a titanium nitride film as an upper layer.

That is, the high-concentration drain region 38e and the pixel electrode 27 are electrically connected through the contact hole 62, the relay layer 55, the contact hole 65, the second relay layer 67 and the contact hole 66. The pixel electrodes 27 and the first alignment film 28 are formed on the third interlayer insulating film 64.

The pixel electrodes 27 are formed in a matrix in plan view and are formed of, for example, a transparent conductive film such as an ITO film. In addition, the first alignment film 28 subjected to an alignment process in a predetermined direction by rubbing or the like is formed on the pixel electrodes 27. The first alignment film 28 is formed of, for example, a transparent organic film such as a polyimide film.

The liquid crystal layer 15 in which an electro-optical material such as liquid crystal is enclosed in a space surrounded by the sealing material 14 (see FIG. 2) is provided on the first alignment film 28. The second alignment film 32 subjected to an alignment process in a predetermined direction by rubbing is formed so as to cover the transparent common electrode 31 on a side facing the liquid crystal layer 15 of the counter substrate 13. The second alignment film 32 is formed of, for example, a transparent organic film such as a polyimide film.

The liquid crystal layer 15 is set in a predetermined alignment state by the first alignment film 28 and the second alignment film 32 in a state in which an electric field is not applied from the pixel electrodes 27. The sealing material 14 is an adhesive which is formed of, for example, a photo-curable resin or a thermosetting resin, for adhering the device substrate 12 and the counter substrate 13 at the circumference thereof, and spacers for maintaining a distance between both substrates at a predetermined value, such as glass fiber or glass beads, are mixed in the sealing material.

Figure 6:
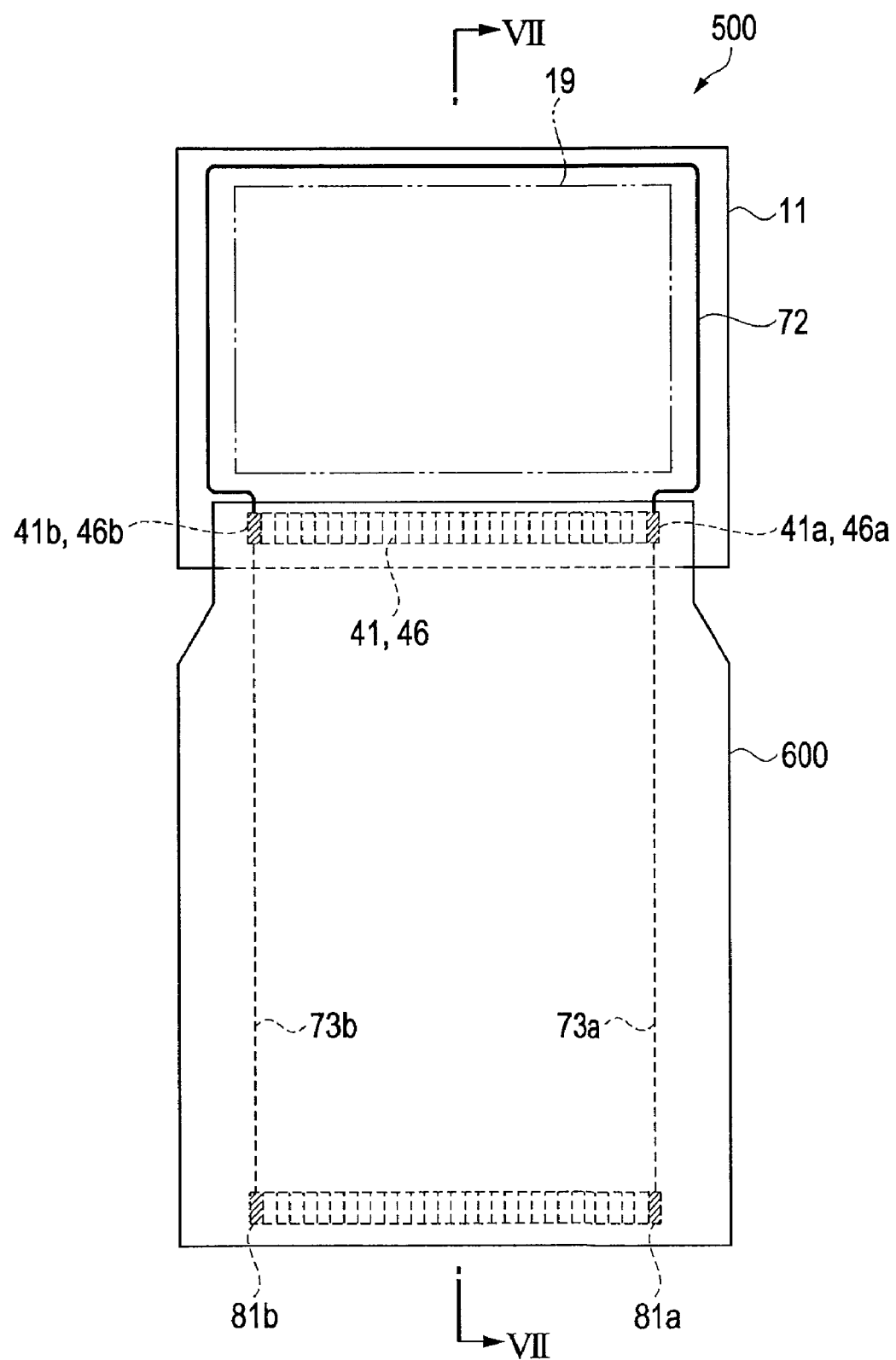
FIG. 6 is a schematic plan view showing the configuration of a liquid crystal device of a first embodiment.
Figure 7:
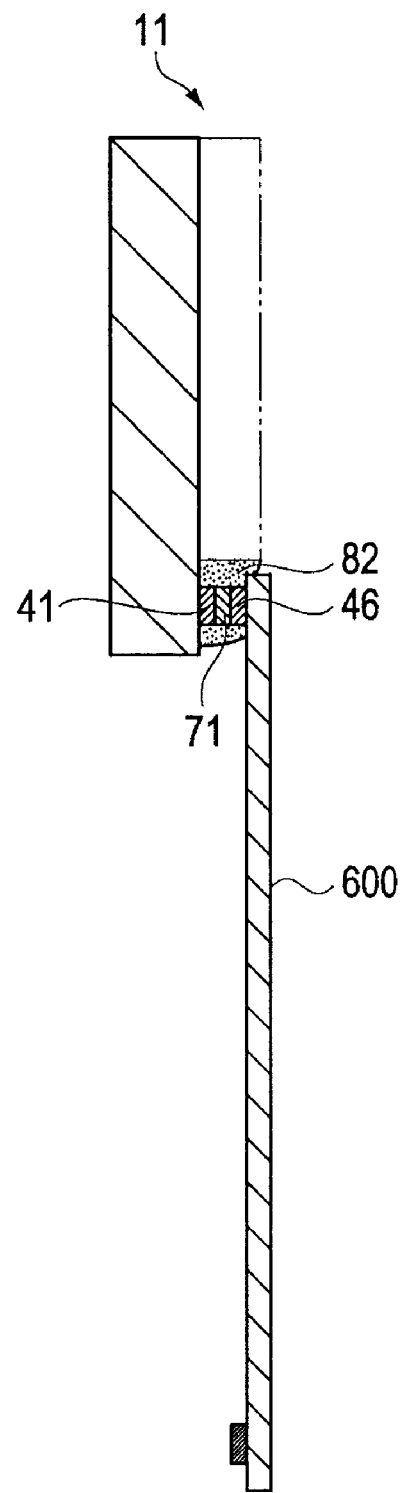
FIG. 7 is a schematic cross-sectional view taken along line VII-VII of the liquid crystal device shown in FIG. 6.
Figure 8:
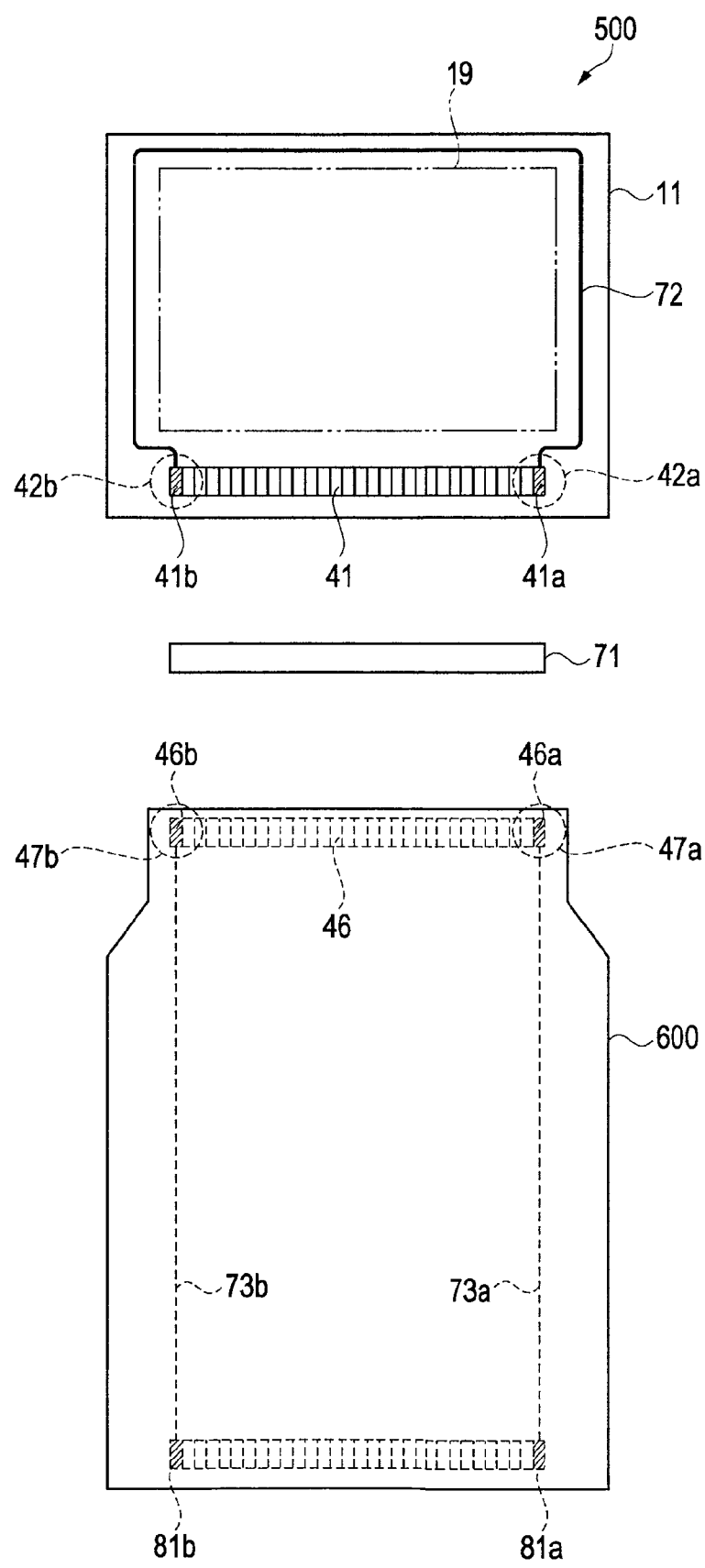
FIG. 8 is a schematic exploded plan view showing the liquid crystal device shown in FIG. 6.
Figure 9:
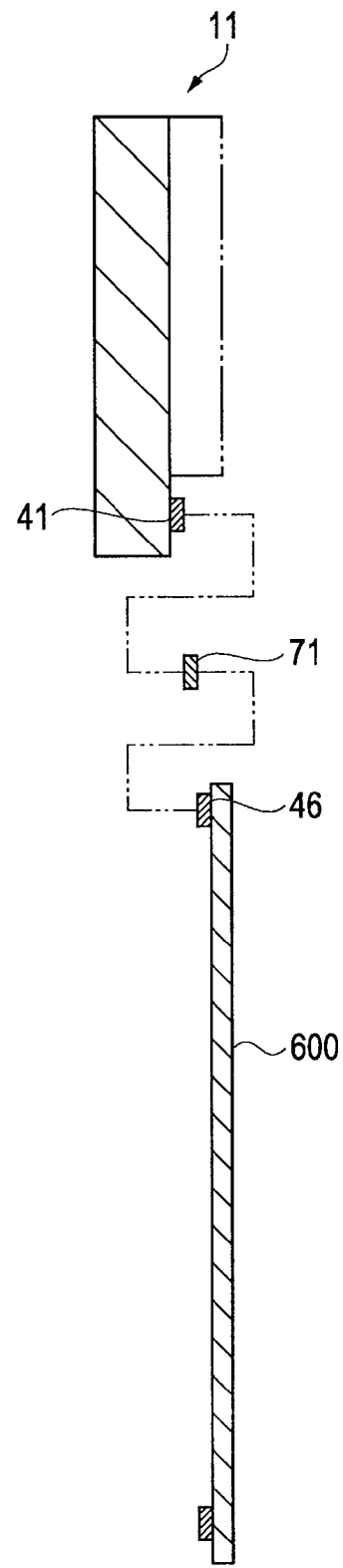
FIG. 9 is a schematic exploded cross-sectional view showing the liquid crystal device shown in FIG. 7.

FIG. 6 is a schematic plan view showing a connection state between a liquid crystal panel and a circuit substrate of a liquid crystal device of a first embodiment. FIG. 7 is a schematic cross-sectional view taken along line VII-VII of the liquid crystal device shown in FIG. 6. FIG. 8 is a schematic exploded plan view showing the liquid crystal device shown in FIG. 6. FIG. 9 is a schematic exploded cross-sectional view showing the liquid crystal device shown in FIG. 7. Hereinafter, the configuration of the liquid crystal device will be described with reference to FIGS. 6 to 9. In addition, in the liquid crystal device shown in FIGS. 6 to 9, the frame 700 is omitted.

As shown in FIGS. 6 to 9, the liquid crystal device 500 includes a liquid crystal panel 11 on which a panel connection terminal portion 41 having a plurality of terminals is provided, and a flexible substrate 600 on which an FPC connection terminal portion 46 having a plurality of connection terminals connected to the panel connection terminal portion 41 is provided. The panel connection terminal portion 41 and the FPC connection terminal portion 46 are electrically connected through an anisotropic conductive film (ACF) 71 as an anisotropic conductive film.

In a first region 42a (see FIG. 8) of the panel connection terminal portion 41, a first panel terminal 41a for checking the connection state between the liquid crystal panel 11 and the flexible substrate 600 as a first terminal is provided. In addition, in a second region 42b of the panel connection terminal portion 41, similar to the above description, a second panel terminal 41b for checking the connection state between the liquid crystal panel 11 and the flexible substrate 600 as a second terminal is provided.

The first region 42a and the second region 42b are preferably close to both end sides of the panel connection terminal portion 41 and the FPC connection terminal portion 46. Since the device substrate 12 and the flexible substrate 600 have different linear expansion coefficients, after they are thermally compressed with an anisotropic conductive film 71 interposed therebetween, the flexible substrate 600 warps at both end sides of the FPC connection terminal portion 46. Accordingly, in portions in which warpage is prone to occur, since a possibility that the electrical connection by the anisotropic conductive film 71 is damaged is higher than in the central portion, it is possible to check the connection state of the overall connection portion by checking the connection state of both end sides.

In the circumference (non-display region) of the display region 19 of the liquid crystal panel 11, a connection wiring 72 which connects the first panel terminal 41a and the second panel terminal 41b and is formed of aluminum or the like is formed. By extending the connection wiring 72 around the circumference of the display region 19, it is possible to electrically connect the two panel terminals 41a and 41b provided in the vicinities of both ends of the panel connection terminal portion 41, without newly providing an insulating film or the like.

The panel connection terminal portion 41 is connected to the FPC connection terminal portion 46 provided on the flexible substrate 600 through the anisotropic conductive film 71. In the panel connection terminal portion 41, the plurality of terminals electrically connected to the data line driving circuit 22 or the scanning line driving circuits 24 is provided in addition to the panel terminals 41a and 41b used for connection inspection.

The panel terminals 41a and 41b configuring the panel connection terminal portion 41 are formed of an electrical conductive material such as aluminum, ITO or the like.

A first FPC terminal 46a for checking the connection between the liquid crystal panel 11 and the flexible substrate 600 is provided in a first region 47a (see FIG. 8) of the FPC connection terminal portion 46. A second FPC terminal 46b for checking the connection between the liquid crystal panel 11 and the flexible substrate 600 is provided in a second region 47b of the FPC connection terminal portion 46, similar to the above description.

The FPC terminals 46a and 46b configuring the FPC connection terminal portion 46 are formed of a material obtained by performing nickel gold plating on copper, a material obtained by performing gold plating on copper, or a material obtained by performing tin plating on copper. In addition, a material configuring the FPC connection terminal portion 46 is not limited to the above-described materials.

The anisotropic conductive film 71 may be interposed between the panel connection terminal portion 41 and the FPC connection terminal portion 46 so as to thermally compress these connection terminal portions, thereby connecting these connection terminal portions. The anisotropic conductive film 71 includes an insulating adhesion material and metal particles of, for example, nickel, gold, silver, copper, aluminum, tin, palladium, ITO, carbon or the like, which are diffused in the insulating adhesion material. In addition to the metal particles, conductive particles obtained by plating a material such as plastic with a metal material may be used. In addition, although, in the present embodiment, the anisotropic conductive film 71 is used, a coated film obtained by coating an insulating adhesion material including metal particles or conductive particles may be used.

A first external terminal 81a electrically connected to the first FPC terminal 46a through an FPC connection wiring 73a is provided on one end of the flexible substrate 600. Similarly, a second external terminal 81b electrically connected to the second FPC terminal 46b through an FPC connection wiring 73b is provided on one end of the flexible substrate 600. The first external terminal 81a and the second external terminal 81b may be included in, for example, an external connection terminal portion.

In the vicinity of the connection portion with the flexible substrate 600 in the liquid crystal panel 11, in order to enhance the electrical connection between the panel connection terminal portion 41 and the FPC connection terminal portion 46, for example, an enhancing agent 82 formed of a photocurable adhesive is provided (see FIG. 7).

Next, a method of checking the electrical connection between the liquid crystal panel 11 and the flexible substrate 600 will be described. First, for example, using a tester or the like, a terminal rod is brought into contact with the first external terminal 81a and the second external terminal 81b so as to check a resistance value. If the liquid crystal panel 11 and the flexible substrate 600 are connected, electricity flows. The resistance value is for example, 2Ω to 4Ω. If stable connection is realized, the resistance value is infinite or an abnormal value such as several times or several tens of times a predetermined resistance value. By checking the resistance value, it is possible to determine whether or not the connection state is appropriate.

As described above, according to the first embodiment, the following effect can be obtained.

(1) According to the first embodiment, since the first panel terminal 41a and the second panel terminal 41b configuring the panel connection terminal portion 41 are electrically connected through the connection wiring 72 extended around the circumference of the display region 19, it is possible to inspect whether the panel connection terminal portion 41 and the FPC connection terminal portion 46 are electrically connected, by checking the connection between the first external terminal 81a and the second external terminal 81b extracted through the FPC connection terminal portion 46. That is, it is possible to detect whether or not the liquid crystal panel 11 and the flexible substrate 600 are electrically connected, by checking the connection between two terminals of the plurality of terminals provided on the liquid crystal panel 11 through the flexible substrate 600.

(2) According to the first embodiment, if the linear expansion coefficients of the liquid crystal panel 11 and the flexible substrate 600 are different, warpage is prone to occur at both end sides of the panel connection terminal portion 41 and the FPC connection terminal portion 46. Accordingly, it is possible to check the connection state of all the connection portions, by checking the connection state of the first panel terminal 41a and the second panel terminal 41b provided on both ends.

(3) According to the first embodiment, since the first panel terminal 41a and the second panel terminal 41b are connected through the connection wiring 72 extended around the circumference of the display region 19, it is possible to check the connection without contact between the panel connection terminal portion 41 and the wiring for connecting the elements in the display region 19. In addition, since a layer for avoiding contact with the wiring may not be formed on the liquid crystal panel 11, it is possible to perform a connection check and to reduce cost.

Second Embodiment
Configuration of Liquid Crystal Device

Figure 10:
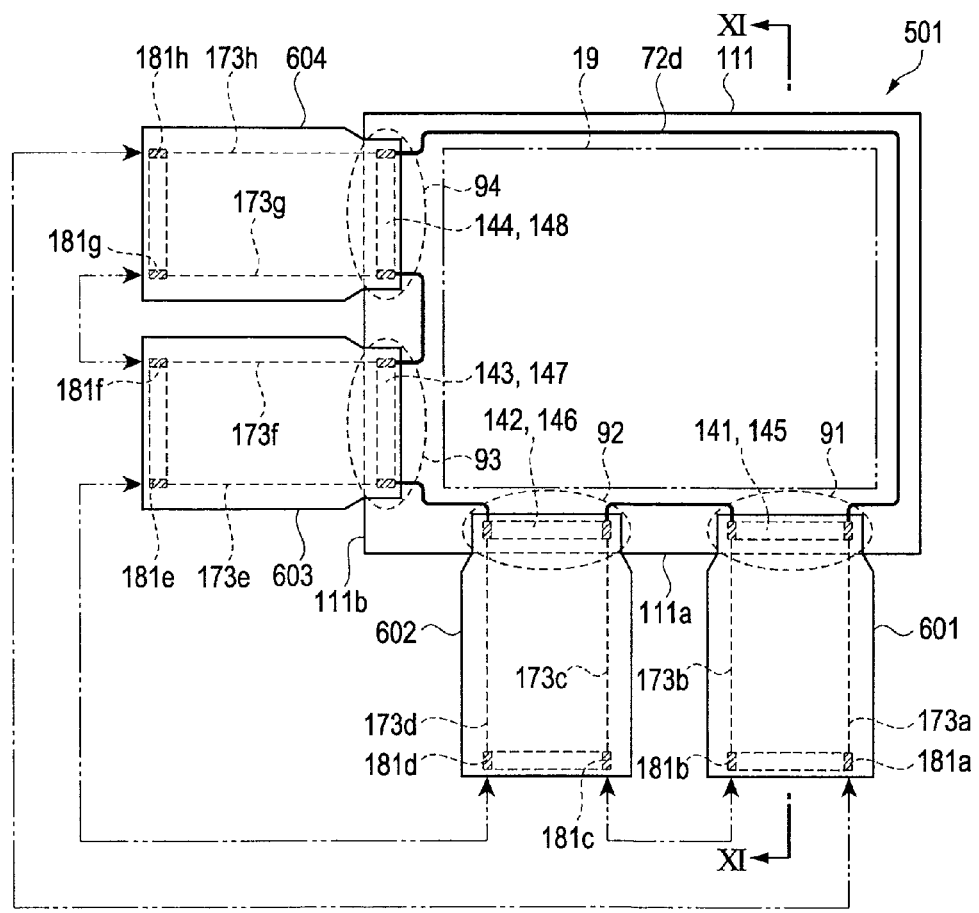
FIG. 10 is a schematic plan view showing the configuration of a liquid crystal device of a second embodiment.
Figure 11:
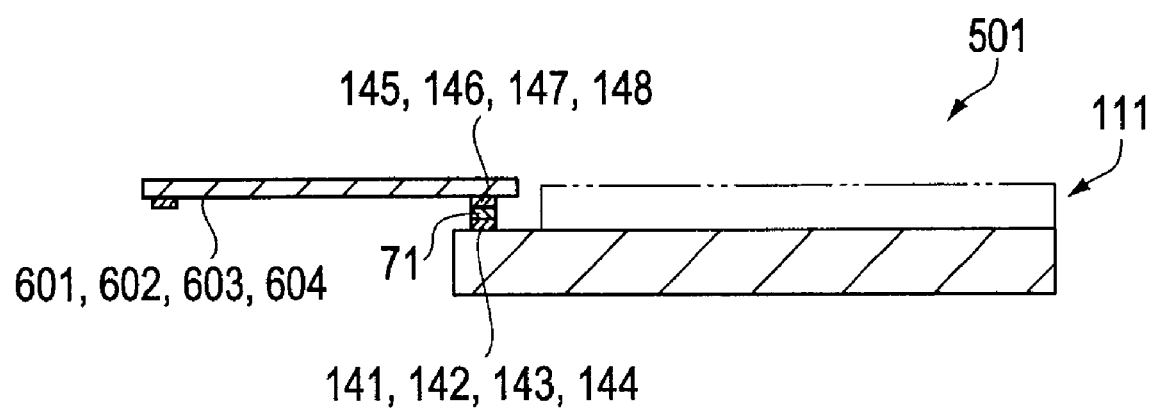
FIG. 11 is a schematic cross-sectional view taken along line XI-XI of the liquid crystal device shown in FIG. 10.
Figure 12:
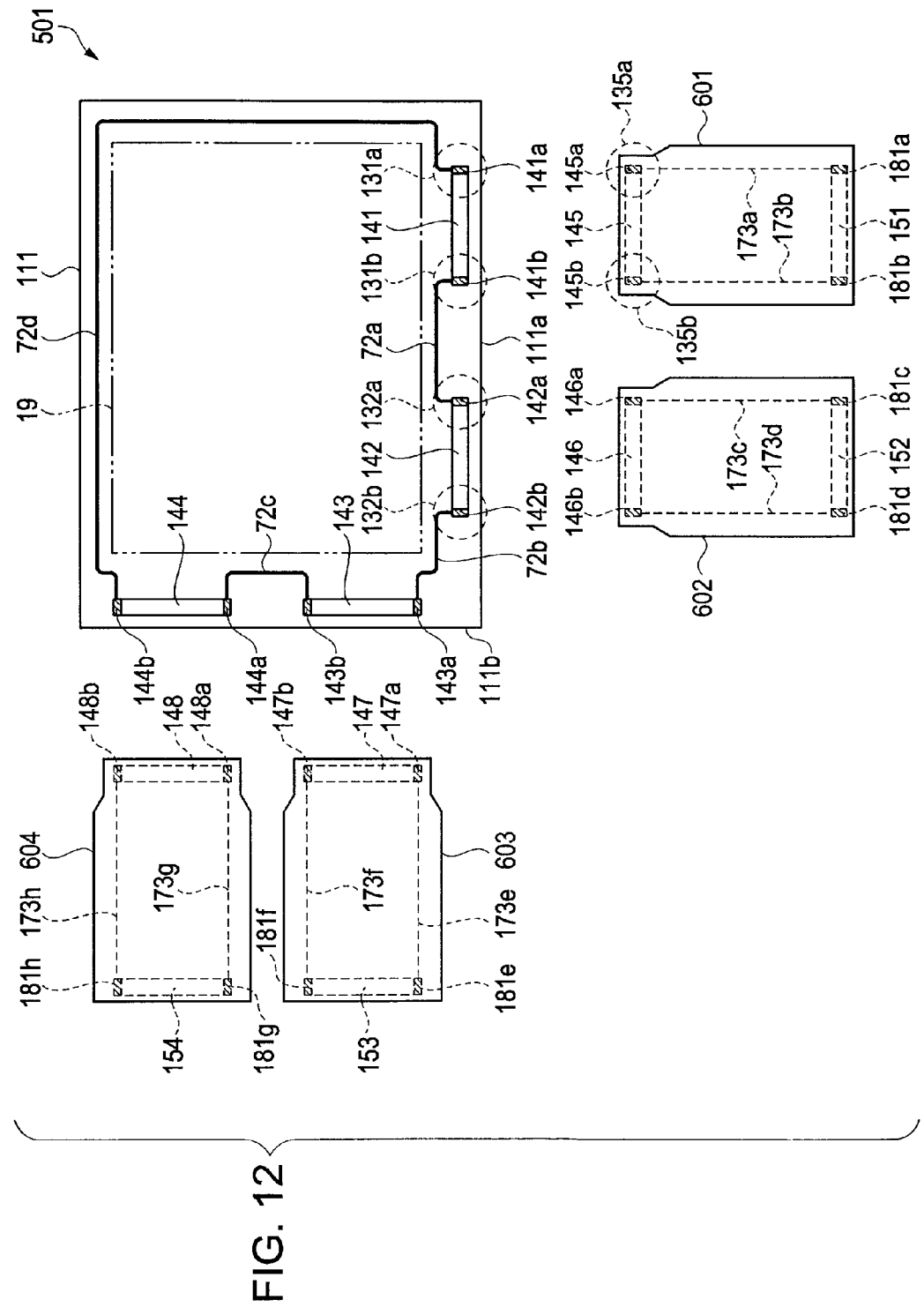
FIG. 12 is a schematic exploded plan view showing the liquid crystal device shown in FIG. 10.

FIG. 10 is a schematic plan view showing the connection state between the liquid crystal panel and the circuit substrate of a liquid crystal device of a second embodiment. FIG. 11 is a schematic cross-sectional view taken along line XI-XI of the liquid crystal device shown in FIG. 10. FIG. 12 is a schematic exploded plan view showing the liquid crystal device shown in FIG. 10. Hereinafter, the configuration of the liquid crystal device will be described with reference to FIGS. 10 to 12.

The liquid crystal device 501 of the second embodiment is different from the first embodiment in that two flexible substrates 601 and 602 and two flexible substrates 603 and 604 are provided on two sides 111a and 111b of the liquid crystal 111 in parallel. Hereinafter, the same configuration members as the first embodiment are denoted by the same reference numerals and the description thereof will be omitted or simplified.

As shown in FIGS. 10 to 12, in the liquid crystal device 501 of the second embodiment, the first flexible substrate 601 (first circuit substrate) and the second flexible substrate 602 (second circuit substrate) are adhered to the first side 111a side of the liquid crystal panel 111 in parallel. In addition, the third flexible substrate 603 and the fourth flexible substrate 604 are adhered to the second side 111b side of the liquid crystal panel 111 in parallel.

Hereinafter, the portion of the first flexible substrate 601 adhered to the liquid crystal panel 111 is referred to as a first connection portion 91, the portion of the second flexible substrate 602 adhered to the liquid crystal panel is referred to as a second connection portion 92, the portion of the third flexible substrate 603 adhered to the liquid crystal panel is referred to as a third connection portion 93, and the portion of the fourth flexible substrate 604 adhered to the liquid crystal panel is referred to as a fourth connection portion 94.

In the first connection portion 91, a first panel connection terminal portion 141 is provided on the liquid crystal panel 111. A first FPC connection terminal portion 145 is provided on the first flexible substrate 601. The first panel connection terminal portion 141 and the first FPC connection terminal portion 145 are electrically connected through an anisotropic conductive film 71.

In detail, in a first region 131a and a second region 131b which are both end portions of the first panel connection terminal portion 141, a first panel terminal 141a and a second panel terminal 141b for checking the connection state between the liquid crystal panel 111 and the first flexible substrate 601 are provided. In a first region 135a and a second region 135b which are both end portions of the first FPC connection terminal portion 145, a first FPC terminal 145a and a second FPC terminal 145b are provided. In addition, the first regions 131a and 135a and the second regions 131b and 135b of the first panel connection terminal portion 141 and the first FPC connection terminal portion 145 are positioned at the same position in plan view, respectively.

Similarly, in the second connection portion 92, a second panel connection terminal portion 142 including a third panel terminal 142a and a fourth panel terminal 142b and a second FPC connection terminal portion 146 including a third FPC terminal 146a and a fourth FPC terminal 146b are electrically connected through the anisotropic conductive film 71.

Similarly, in the third connection portion 93, a third panel connection terminal portion 143 including a fifth panel terminal 143a and a sixth panel terminal 143b and a third FPC connection terminal portion 147 including a fifth FPC terminal 147a and a sixth FPC terminal 147b are electrically connected through the anisotropic conductive film 71.

Similarly, in the fourth connection portion 94, a fourth panel connection terminal portion 144 including a seventh panel terminal 144a and an eighth panel terminal 144b and a fourth FPC connection terminal portion 148 including a seventh FPC terminal 148a and an eighth FPC terminal 148b are electrically connected through the anisotropic conductive film 71.

In addition, in the liquid crystal panel 111, the ends of the adjacent panel connection terminal portions 141 to 144 are electrically connected. For example, the second panel terminal 141b and the third panel terminal 142a are electrically connected through a connection wiring 72a (second connection wiring) formed of aluminum or the like. In addition, the fourth panel terminal 142b and the fifth panel terminal 143a are electrically connected through a connection wiring 72b. In addition, the sixth panel terminal 143b and the seventh panel terminal 144a are electrically connected through a connection wiring 72c.

In addition, the eighth panel terminal 144b and the first panel terminal 141a are electrically connected through a connection wiring 72d (first connection wiring). In this way, by connecting the connection wirings 72a to 72d, it is possible to check the connection state between the liquid crystal panel 111 and the flexible substrates 601 to 604 without obstruction of wirings (not shown) for connecting the display region 19 (each pixel) and each terminal of the panel connection terminal portions 141 to 144.

On one end of the first flexible substrate 601, a first external connection terminal portion 151 is provided, and a first external terminal 181a electrically connected to the first FPC terminal 145a through an FPC connection wiring 173a is provided. Similarly, on one end of the first flexible substrate 601, a second external terminal 181b electrically connected to the second FPC terminal 145b through an FPC connection wiring 173b is provided.

Similarly, on one end of the second flexible substrate 602, a second external connection terminal portion 152 is provided, and a third external terminal 181c and a fourth external terminal 181d electrically connected to the FPC terminals 146a and 146b through FPC connection wirings 173c and 173d are provided. Similarly, on one end of the third flexible substrate 603, a third external connection terminal portion 153 is provided, and a fifth external terminal 181e and a sixth external terminal 181f electrically connected to the FPC terminals 147a and 147b through FPC connection wirings 173e and 173f are provided. Similarly, one end of the fourth flexible substrate 604, a fourth external connection terminal portion 154 is provided, and a seventh external terminal 181g and an eighth external terminal 181h electrically connected to the FPC terminals 148a and 148b through FPC connection wirings 173g and 173h are provided.

Next, a method of checking whether or not the liquid crystal panel 111 and the flexible substrates 601 to 604 are electrically connected will be described. In addition, the basic checking method is equal to the first embodiment. First, the connection between the ends of the adjacent flexible substrates 601 to 604 connected with the connection wirings 72a to 72d is checked.

In detail, the connection between the second external terminal 181b and the third external terminal 181c is checked. Similarly, the connection between the fourth external terminal 181d and the fifth external terminal 181e, the sixth external terminal 181f and the seventh external terminal 181g, and the eighth external terminal 181h and the first external terminal 181a connected by extending around the circumference of the display region 19 is checked.

If all connections are confirmed, it is determined that the liquid crystal panel 111 and the flexible substrates 601 to 604 are electrically connected. If a non-connected portion is confirmed, it is determined that connection failure occurs.

As described above, according to the second embodiment, the following effects can be obtained in addition to the effects (2) and (3) of the first embodiment.

(4) According to the second embodiment, even when the first panel connection terminal portion 141 to the fourth panel connection terminal portion 144 are arranged adjacent to each other along the first side 111a and the second side 111b, since the adjacent second panel terminal 141b and third panel terminal 142a, the adjacent fourth panel terminal 142b and fifth panel terminal 143a, and the like are electrically connected and the first panel terminal 141a and the eighth panel terminal 144b are connected through the connection wiring 72d extended around the circumference of the display region 19, it is possible to inspect whether or not the connection portions are electrically connected using the first external terminal 181a to the eighth external terminal 181h extracted through the first FPC connection terminal portion 145 to the fourth FPC connection terminal portion 148. That is, it is possible to detect whether or not the liquid crystal panel 111 and each of the flexible substrates 601 to 604 is electrically connected, by checking the connection state through the first flexible substrate 601 to the fourth flexible substrate 604.

Third Embodiment
Configuration of Liquid Crystal Device

Figure 13:
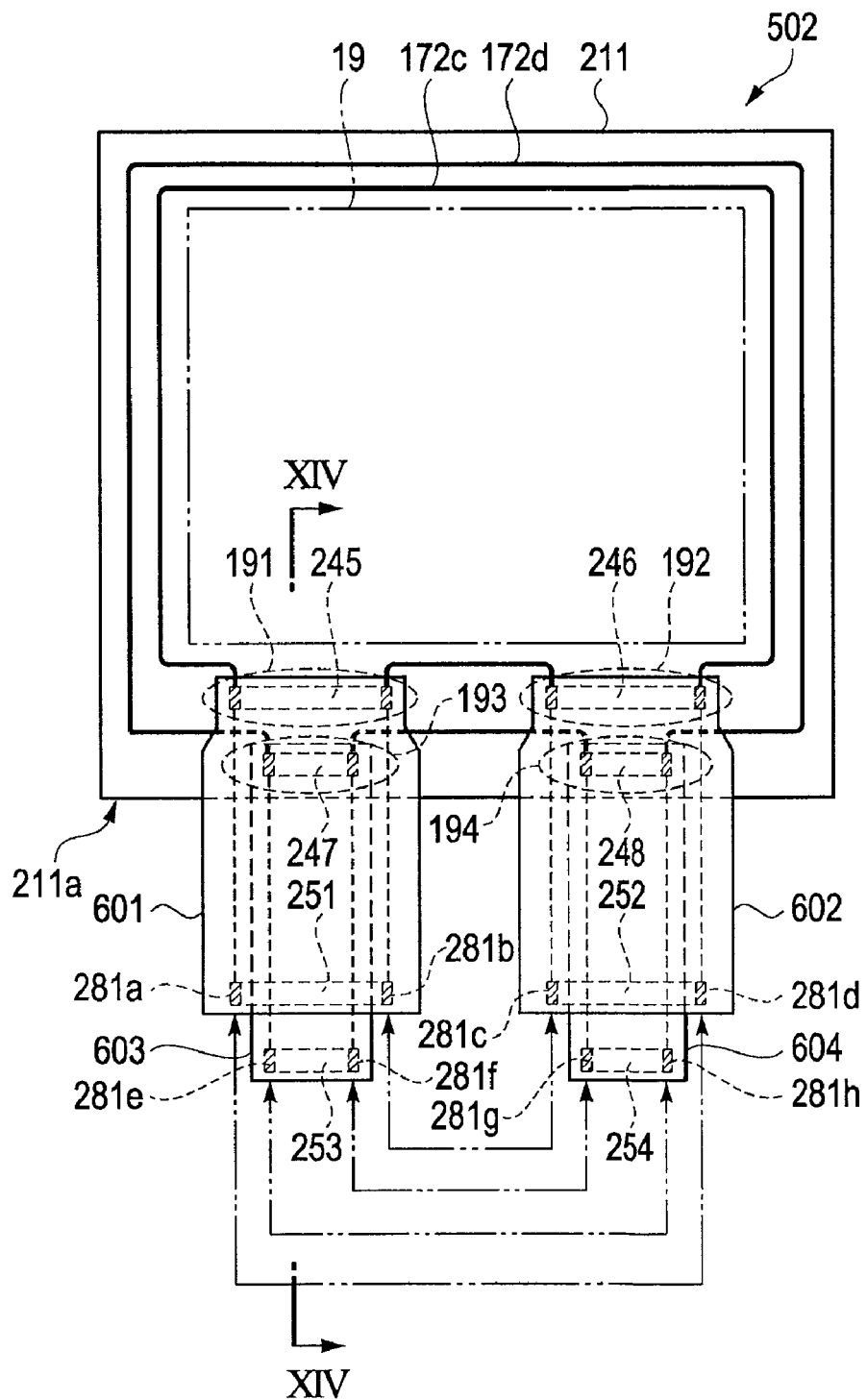
FIG. 13 is a schematic plan view showing the configuration of a liquid crystal device of a third embodiment.
Figure 14:
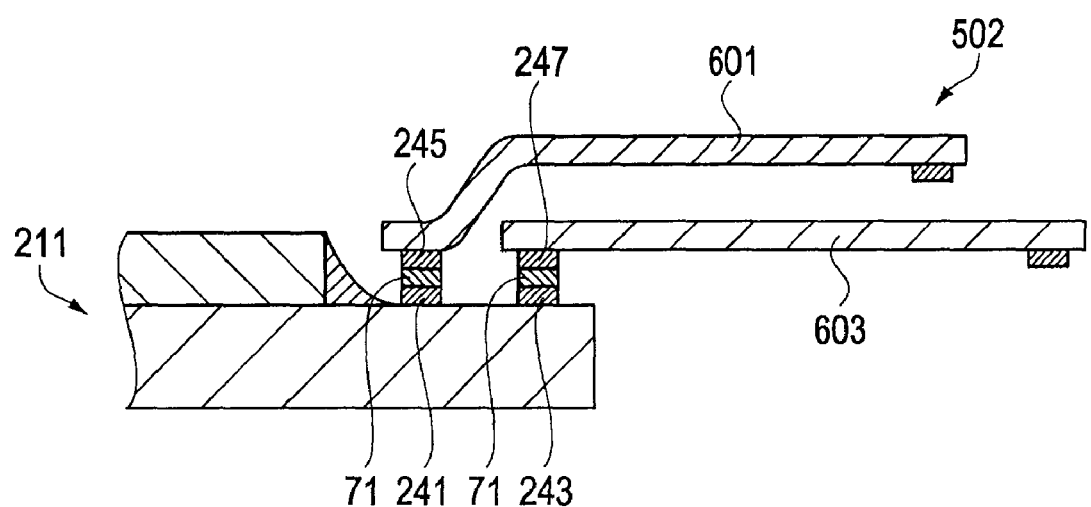
FIG. 14 is a schematic cross-sectional view taken along line XIV-XIV of the liquid crystal device shown in FIG. 13.
Figure 15:
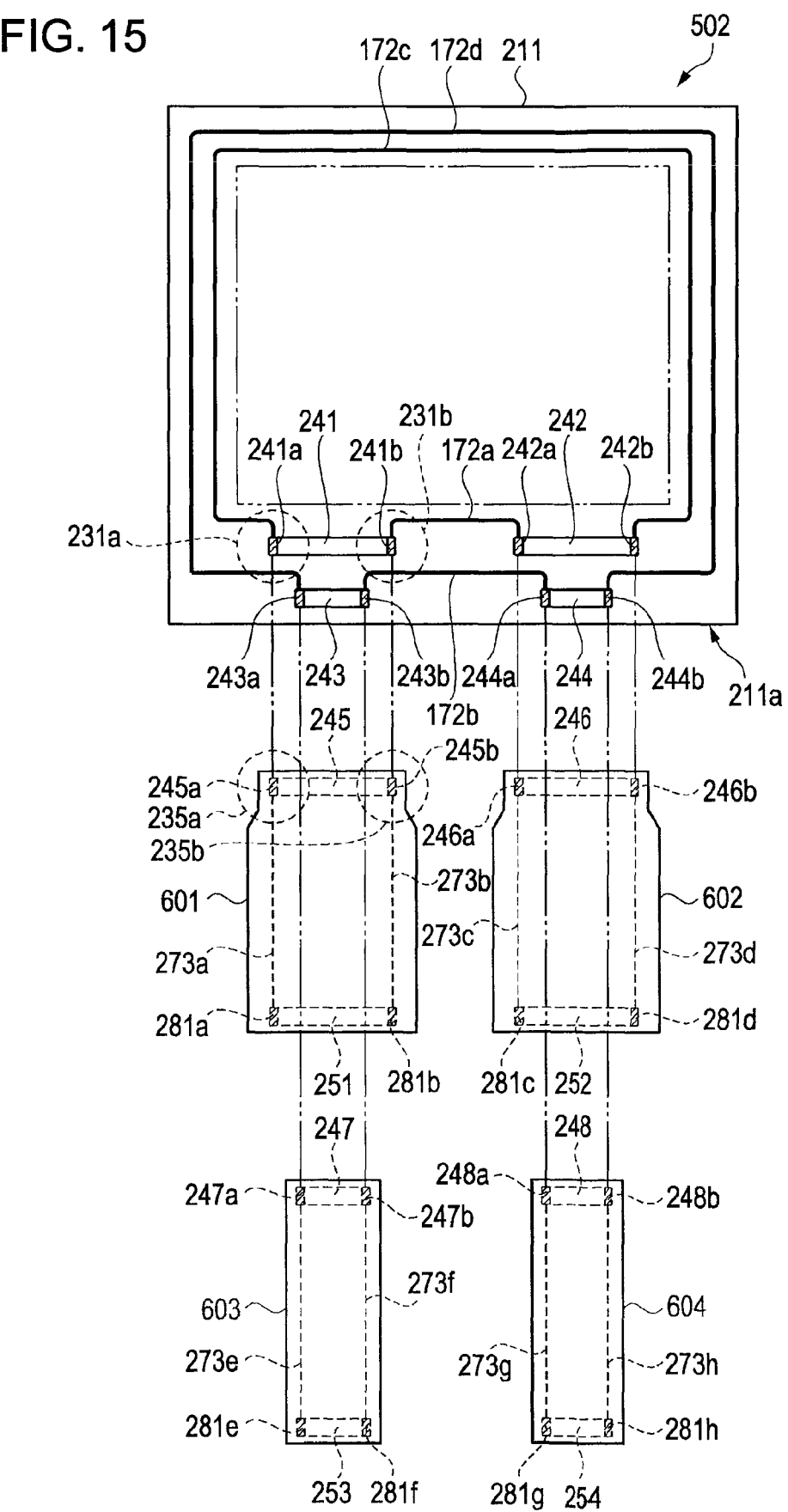
FIG. 15 is a schematic exploded plan view showing the liquid crystal device shown in FIG. 13.

FIG. 13 is a schematic plan view showing a connection state between a liquid crystal panel and a circuit substrate in a liquid crystal device of a third embodiment. FIG. 14 is a schematic cross-sectional view taken along line XIV-XIV of the liquid crystal device shown in FIG. 13. FIG. 15 is a schematic exploded plan view showing the liquid crystal device shown in FIG. 13. Hereinafter, the configuration of the liquid crystal device will be described with reference to FIGS. 13 to 15. In addition, in the used drawings, the sizes of panel connection terminal portions, FPC connection terminal portions and flexible substrates are differently shown such that the described portions are recognized.

The liquid crystal device 502 of the third embodiment is different from the first embodiment in that two flexible substrates are horizontally provided in a first side 211a of a liquid crystal panel 211 in two stages of an upper stage and a lower stage. Hereinafter, the same components as the first embodiment are denoted by the same reference numerals and the description thereof will be omitted or simplified.

As shown in FIGS. 13 to 15, in the liquid crystal device 502 of the third embodiment, a first flexible substrate 601 (first circuit substrate) and a second flexible substrate 602 are horizontally provided in parallel in the vicinity of a display region 19 of the first side 211a side of the liquid crystal panel 211. In addition, a third flexible substrate 603 (third circuit substrate) and a fourth flexible substrate 604 are horizontally provided in parallel in a direction separated from the display region 19 of the first side 211a side.

Hereinafter, a portion of the first flexible substrate 601 adhered to the liquid crystal panel 211 is referred to as a first connection portion 191, a portion of the second flexible substrate 602 adhered to the liquid crystal panel is referred to as a second connection portion 192, a portion of the third flexible substrate 603 adhered to the liquid crystal panel is referred to as a third connection portion 193, and a portion of the fourth flexible substrate 604 adhered to the liquid crystal panel is referred to as a fourth connection portion 194.

In the first connection portion 191, a first panel connection terminal portion 241 is provided on the liquid crystal panel 211. On the first flexible substrate 601, a first FPC connection terminal portion 245 (first connection terminal portion) is provided. The first panel connection terminal portion 241 and the first FPC connection terminal portion 245 are electrically connected through an anisotropic conductive film 71.

In detail, in a first region 231a and a second region 231b which are both end portions of the first panel connection terminal portion 241, a first panel terminal 241a and a second panel terminal 241b for checking the connection state between the liquid crystal panel 211 and the first flexible substrate 601 are provided. In a first region 235a and a second region 235b which are both end portions of the first FPC connection terminal portion 245, a first FPC terminal 245a and a second FPC terminal 245b are provided. In addition, the first regions 231a and 235a and the second regions 231b and 235b of the first panel connection terminal portion 241 and the first FPC connection terminal portion 245 are positioned at the same position (overlapping position) in plan view.

Similarly, in the second connection portion 193, a second panel connection terminal portion 242 including a third panel terminal 242a and a fourth panel terminal 242b and a second FPC connection terminal portion 246 including a third FPC terminal 246a and a fourth FPC terminal 246b are electrically connected through the anisotropic conductive film 71.

Similarly, in the third connection portion 193, a third panel connection terminal portion 243 including a fifth panel terminal 243a and a sixth panel terminal 243b and a third FPC connection terminal portion 247 including a fifth FPC terminal 247a and a sixth FPC terminal 247b are electrically connected through the anisotropic conductive film 71.

Similarly, in the fourth connection portion 194, a fourth panel connection terminal portion 244 including a seventh panel terminal 244a and an eighth panel terminal 244b and a fourth FPC connection terminal portion 248 including a seventh FPC terminal 248a and an eighth FPC terminal 248b are electrically connected through the anisotropic conductive film 71.

In the liquid crystal panel 211, the ends of the adjacent panel connection terminal portions are electrically connected. For example, the second panel terminal 241b and the third panel terminal 242a are electrically connected through a connection wiring 172a (fourth connection wiring) formed of aluminum or the like. In addition, the sixth panel terminal 243b and the seventh panel terminal 244a are electrically connected through a connection wiring 172b (fourth connection wiring).

In addition, the first panel terminal 241a and the fourth panel terminal 242b are electrically connected through a connection wiring 172c (third connection wiring) arranged so as to be extended around the circumference of the display region 19. Similarly, the fifth panel terminal 243a and the eighth panel terminal 244b are electrically connected through a connection wiring 172d (third connection wiring) arranged so as to be extended around the circumference of the display region 19.

In this way, by connecting the connection wirings 172a to 172d, it is possible to check the connection state between the liquid crystal panel 211 and the flexible substrates 601 to 604 without obstruction of wirings (not shown) for connecting the display region 19 (each pixel) and each terminal of the panel connection terminal portions 241 to 244.

On one end of the first flexible substrate 601, a first external connection terminal portion 251 is provided, and a first external terminal 281a electrically connected to the first FPC terminal 245a through an FPC connection wiring 273a is provided. Similarly, on one end of the first flexible substrate 601, a second external terminal 281b electrically connected to the second FPC terminal 245b through an FPC connection wiring 273b is provided.

Similarly, on one end of the second flexible substrate 602, a second external connection terminal portion 252 is provided, and a third external terminal 281c and a fourth external terminal 281d electrically connected to the FPC terminals 246a and 246b through FPC connection wirings 273c and 273d are provided. Similarly, on one end of the third flexible substrate 603, a third external connection terminal portion 253 is provided, and a fifth external terminal 281e and a sixth external terminal 281f electrically connected to the FPC terminals 247a and 247b through FPC connection wirings 273e and 273f are provided. Similarly, one end of the fourth flexible substrate 604, a fourth external connection terminal portion 254 is provided, and a seventh external terminal 281g and an eighth external terminal 281h electrically connected to the FPC terminals 248a and 248b through FPC connection wirings 273g and 273h are provided.

Next, a method of checking whether or not the liquid crystal panel 211 and the flexible substrates 601 to 604 are electrically connected will be described. In addition, the basic checking method is similar to that in the first embodiment. First, the connection between the ends of the adjacent flexible substrates 601 to 604 connected with the connection wirings 172a to 172d is checked.

In detail, the connection between the second external terminal 281b and the third external terminal 281c is checked. Similarly, the connection between the sixth external terminal 281f and the seventh external terminal 281g, and the first external terminal 281a and the fourth external terminal 281d and the fifth external terminal 281e and the eighth external terminal 281h connected by extending around the circumference of the display region 19 is checked.

If all connections are confirmed, it is determined that the liquid crystal panel 211 and the flexible substrates 601 to 604 are electrically connected. If a non-connected portion is confirmed, it is determined that connection failure occurs.

As described above, according to the third embodiment, the following effects can be obtained in addition to the effects (2) and (3) of the first embodiment.

(5) According to the third embodiment, even when the first panel connection terminal portion 241 and the second panel connection terminal portion 242 are arranged in parallel and the third panel connection terminal portion 243 and the fourth panel connection terminal portion 244 are arranged in parallel on the lower side (the direction separated from the display region 19) thereof, the adjacent panel terminals 241b and 242a, 243b and 244a are electrically connected through the connection wirings 172a and 172b and the separated panel terminals 241a and 242b, 243a and 244b are electrically connected through the connection wirings 172c and 172d. Accordingly, it is possible to inspect whether or not each of the connection portions are electrically connected using the external terminals 281a to 281h extracted through the first FPC connection terminal portion 245 to the fourth FPC connection terminal portion 248. That is, it is possible to detect whether or not the liquid crystal panel 211 and the flexible substrates 601 to 604, by checking the connection state through the flexible substrates 601 to 604.

Fourth Embodiment
Configuration of Liquid Crystal Device

Figure 16:
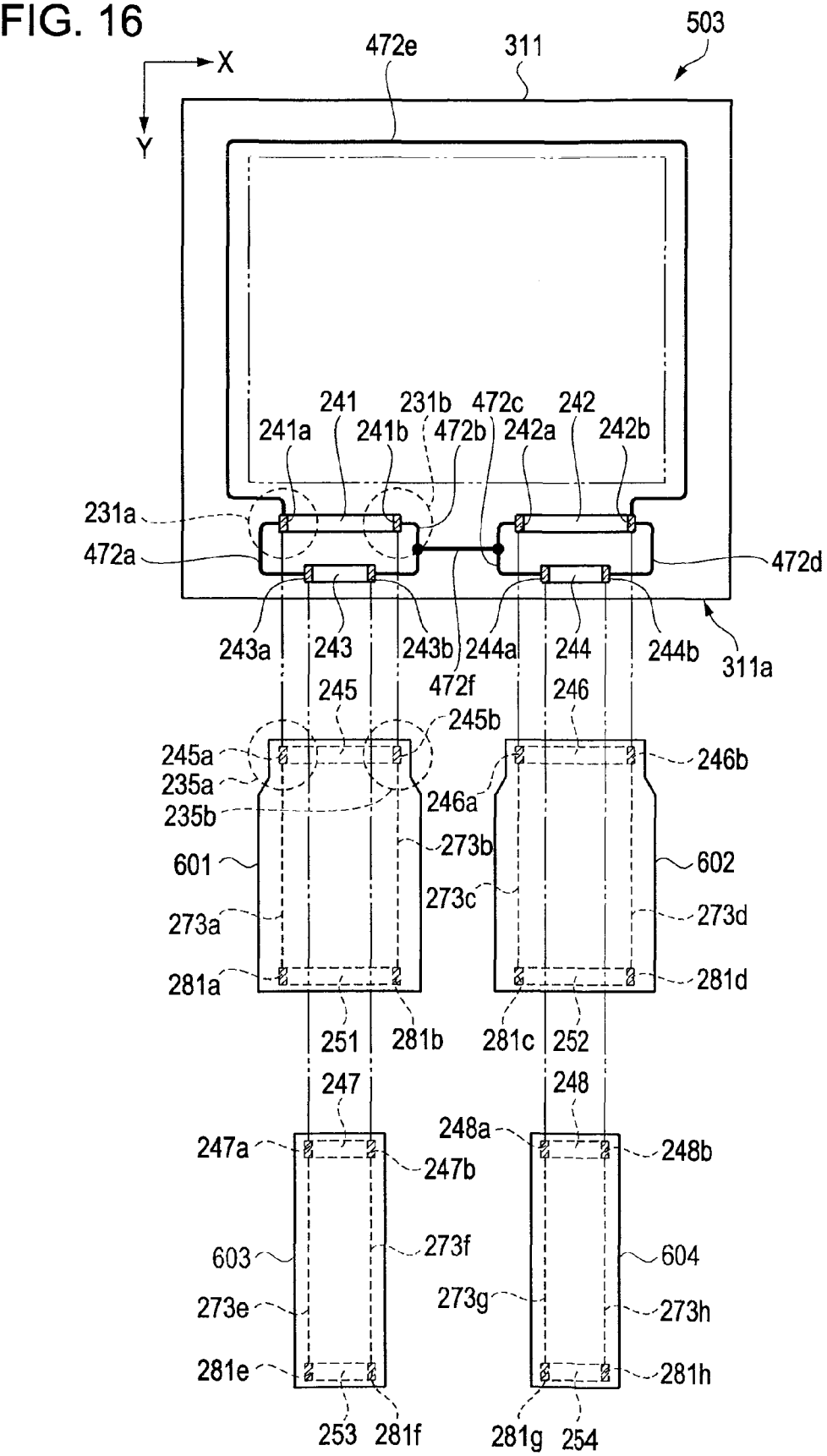
FIG. 16 is a schematic exploded plan view showing a liquid crystal device of a fourth embodiment.

FIG. 16 is a schematic exploded plan view showing a liquid crystal device of a fourth embodiment. Hereinafter, the configuration of the liquid crystal device will be described with reference to FIG. 16. In addition, in the used drawings, the sizes of panel connection terminal portions, FPC connection terminal portions and flexible substrates are differently shown such that the described portions are recognized.

In the liquid crystal device 503 of the fourth embodiment, similar to the liquid crystal device 502 of the third embodiment, two flexible substrates are horizontally provided in a first side 311a of a liquid crystal panel 311 in two stages of an upper stage and a lower stage. The liquid crystal device 503 is different from the third embodiment in terms of the layout of the connection wirings. Hereinafter, the same components as the third embodiment are denoted by the same reference numerals and the description thereof will be omitted or simplified.

As shown in FIG. 16, in the liquid crystal device 503 of the fourth embodiment, similar to the third embodiment, a first flexible substrate 601 (first circuit substrate) and a second flexible substrate 602 are horizontally (in an X direction) provided in parallel in the vicinity of a display region 19 of the first side 311a side of the liquid crystal panel 311. In addition, a third flexible substrate 603 (third circuit substrate) and a fourth flexible substrate 604 are horizontally (in the X direction) provided in parallel in a direction separated from the display region 19 of the first side 311a side.

The configuration of the connection portions 191, 192, 193 and 194 (see FIG. 13) is similar to that of the liquid crystal device 502 of the third embodiment. The configuration of the flexible substrates 601, 602, 603 and 604 is similar to that of the liquid crystal device 502 of the third embodiment. That is, as described above, the layout of the connection wirings is different from that of the liquid crystal device 502 of the third embodiment.

In the liquid crystal panel 311 of the fourth embodiment, the ends of the adjacent panel connection terminal portions are electrically connected. For example, the first panel terminal 241a and the fifth panel terminal 243a arranged in a Y direction are electrically connected through a connection wiring 472a formed of aluminum or the like. In addition, the second panel terminal 241b and the sixth panel terminal 243b arranged in the Y direction are electrically connected through a connection wiring 472b.

Further, the third panel terminal 242a and the seventh panel terminal 244a arranged in the Y direction are electrically connected through a connection wiring 472c (seventh connection wiring). The fourth panel terminal 242b and the eighth panel terminal 244b arranged in the Y direction are electrically connected through a connection wiring 472d (eighth connection wiring).

Each of the panel terminals 241a to 244b are, for example, connected to a constant potential LCCOM. In this way, by using a constant potential terminal as a connection check, it is possible to reduce the number of terminals of the panel connection terminal portions 241 to 244, compared with the case where a dedicated terminal is provided. In addition, if there is room in the number of terminals in the panel connection terminal portions 241 to 244, a dedicated terminal for connection check may be provided.

The first panel terminal 241a and the fourth panel terminal 242b are electrically connected through the connection wiring 472e arranged so as to be extended around the circumference (for example, the outside of the sealing material 14 in plan view) of the display region 19. In addition, the connection wiring 472e may partially overlap the sealing material 14 in plan view. Further, the connection wiring 472b and the connection wiring 472c arranged in the X direction are electrically connected through a connection wiring 472f (ninth connection wiring). In addition, each of the connection wirings 472a to 472f are connected over the layers laminated on the device substrate 12 without obstruction of the other wirings (for example, the data lines and the like).

In this way, by connecting the connection wirings 472a to 472f, it is possible to check the connection state between the liquid crystal panel 311 and the flexible substrates 601 to 604 without obstruction of wirings (not shown) for connecting the display region 19 (each pixel) and each terminal of the panel connection terminal portions 241 to 244.

Next, a method of checking the connection state between the liquid crystal panel 311 and the flexible substrates 601 to 604 will be described. In addition, the basic checking method is similar to the first embodiment. In detail, the connection between the ends of the adjacent flexible substrates 601 to 604 is checked. If appropriate connection is realized, a substantially predetermined resistance value is measured. If connection is not realized, the resistance value becomes infinite. If an appropriate connection is not realized, a value significantly deviated from the predetermined resistance value is obtained. Hereinafter, a method of detecting at which terminal connection failure occurs when connection is not realized or appropriate connection is not realized will be described.

For example, when the connection between the second external terminal 281b and the third external terminal 281c is checked, the resistance value may be set to be infinite (failure). In this case, it is not determined at which or both of the second external terminal 281b and the third external terminal 281c connection failure occurs.

Next, when the connection between the second external terminal 281b and the sixth external terminal 281f is checked, the resistance value may be set to be a normal value. Accordingly, it is determined that the connection state of the second external terminal 281b is normal.

Next, when the connection between the third external terminal 281c and the sixth external terminal 281f is checked, the resistance value may be set to be infinite. Accordingly, it is determined that the connection state of the third external terminal 281c fails.

In the state in which three or more panel terminals are provided the panel terminals are connected along the plurality of panel terminals, the resistance value between the panel terminal, the resistance value of which may be set to be infinite, and another panel terminal connected to this panel terminal is sequentially checked so as to specify the position where connection failure occurs. In addition, without being limited to the use of the three external terminals, by measuring the resistance value between the panel terminals connected by the connection wiring, it is possible to specify the position where failure occurs.

In addition, by obtaining an indication of the resistance value from the length of the connection wiring for connecting the terminals in advance, for example, if the resistance value measured in the connection check is significantly deviated from the reference value, it may be determined that appropriate connection state is not realized (for example, a state in which the terminal portion is inclined and pressed, or the like) (diagnosis using the resistance value).

As described above, according to the fourth embodiment, the following effects can be obtained in addition to the effects (2) and (3) of the first embodiment.

(6) According to the fourth embodiment, when the first panel connection terminal portion 241 and the second panel connection terminal portion 242 are horizontally arranged in parallel and the third panel connection terminal portion 243 and the fourth panel connection terminal portion 244 are horizontally arranged in parallel on the lower side (the direction separated from the display region 19) thereof, the adjacent panel terminals are electrically connected through the connection wirings 472a to 472f. Accordingly, it is possible to inspect whether or not each of the connection portions are electrically connected using the external terminals 281a to 281h extracted through the first FPC connection terminal portion 245 to the fourth FPC connection terminal portion 248.

(7) According to the fourth embodiment, since the panel terminals 241a to 244b are electrically connected to the plurality of different panel terminals 241a to 244b respectively through the connection wirings 472a to 472f, it is possible to determine whether or not connection is realized and to specify a panel terminal in which connection failure occurs. Accordingly, in the next mounting process, it is possible to correct the bad connection state of the panel terminal to an appropriate connection state. By providing the plurality of panel connection terminal portions 241 to 244, even when a plurality of positions where connection is not realized is present, it is possible to specify positions where failure occurs.

Fifth Embodiment

Configuration of Electronic Apparatus

Figure 17:
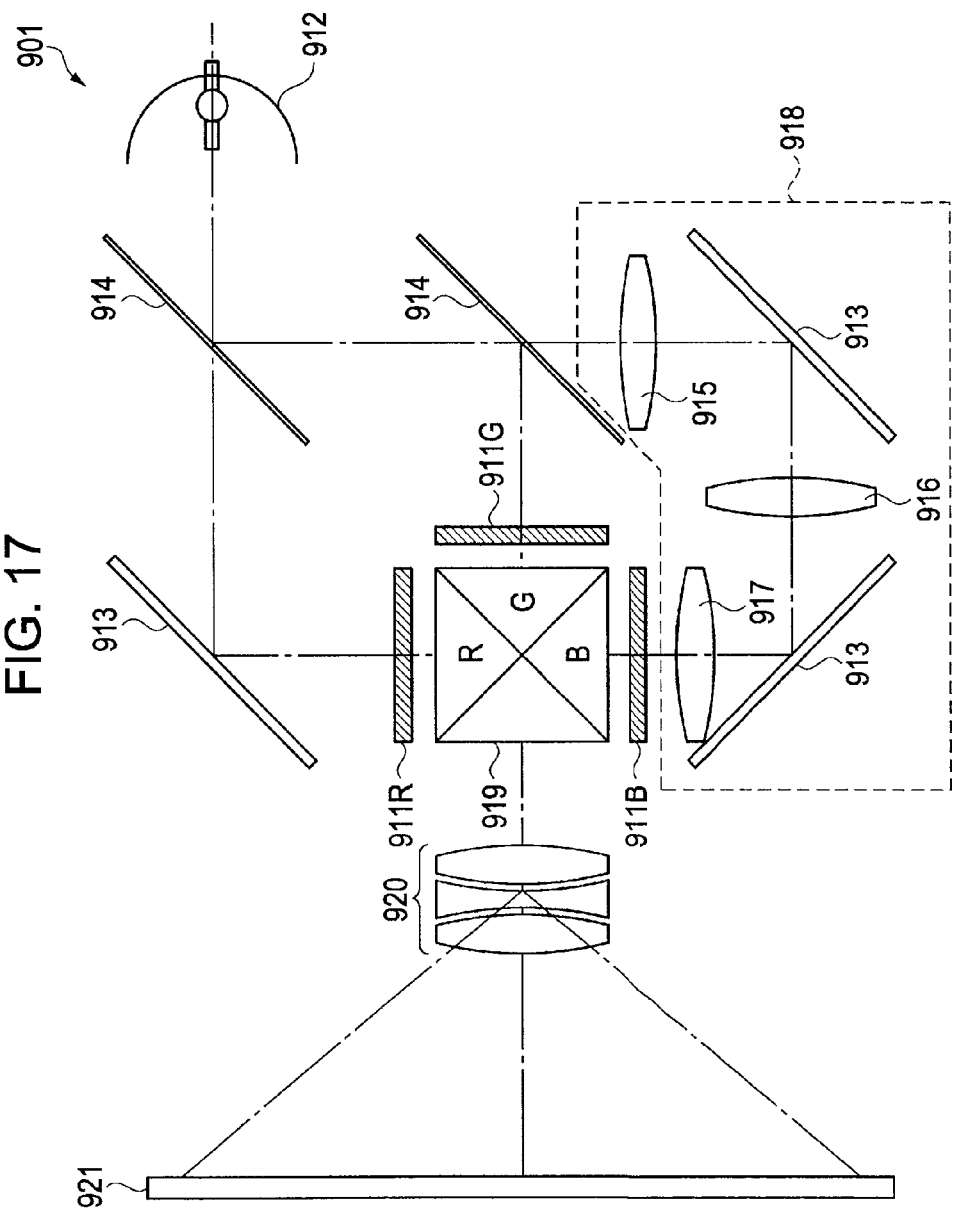
FIG. 17 is a schematic view showing the configuration of a liquid crystal projector which is an example of an electronic apparatus.

FIG. 17 is a schematic view showing the configuration of a liquid crystal projector which is an example of an electronic apparatus including the above-described liquid crystal device. Hereinafter, the configuration of the liquid crystal projector including the liquid crystal device will be described with reference to FIG. 17.

As shown in FIG. 17, the liquid crystal projector 901 has a structure in which three liquid crystal modules each employing any one of the liquid crystal devices 500, 501, 502 and 503 are disposed so as to be used as light valves 911R, 911G and 911B for RGB.

In detail, when projection light is emitted from a lamp unit 912 of a white light source such as a metal hydro lamp, the light is divided into light components R, G and B corresponding to three primary colors of RGB by three mirrors 913 and two dichroic mirrors 914 and is guided to light valves 911R, 911G and 911B corresponding to the respective colors. In particular, the light component B is guided through a relay lens system 918 formed of an incident lens 915, a relay lens 916 and a light emitting lens 917, in order to prevent light loss by a long light path.

The light components R, G and B corresponding to the three primary colors modulated by the light valves 911R, 911G and 911B are synthesized by a dichroic prism 919 again and are projected onto a screen 921 through a projection lens 920 as a color image.

The liquid crystal projector 901 having the above configuration can perform a high-quality display through the liquid crystal modules each employing any one of the above-described liquid crystal devices 500, 501, 502 and 503. In addition, the liquid crystal devices 500, 501, 502 and 503 may be used in various electronic apparatus such as a high-definition Electric View Finder (EVF), a cellular telephone, a mobile computer, a digital camera, a digital video camera, a television, an in-vehicle apparatus or an audio device, in addition to the liquid crystal projector 901.

As described above, according to the fifth embodiment, the following effects can be obtained.

(8) According to the fifth embodiment, since the liquid crystal devices of the first to fourth embodiments are included, it is possible to provide an electronic apparatus with high reliability in electrical characteristics.

In addition, the embodiments are not limited to the above-described embodiments and the following embodiments can be realized.

MODIFIED EXAMPLE 1

Figure 18:
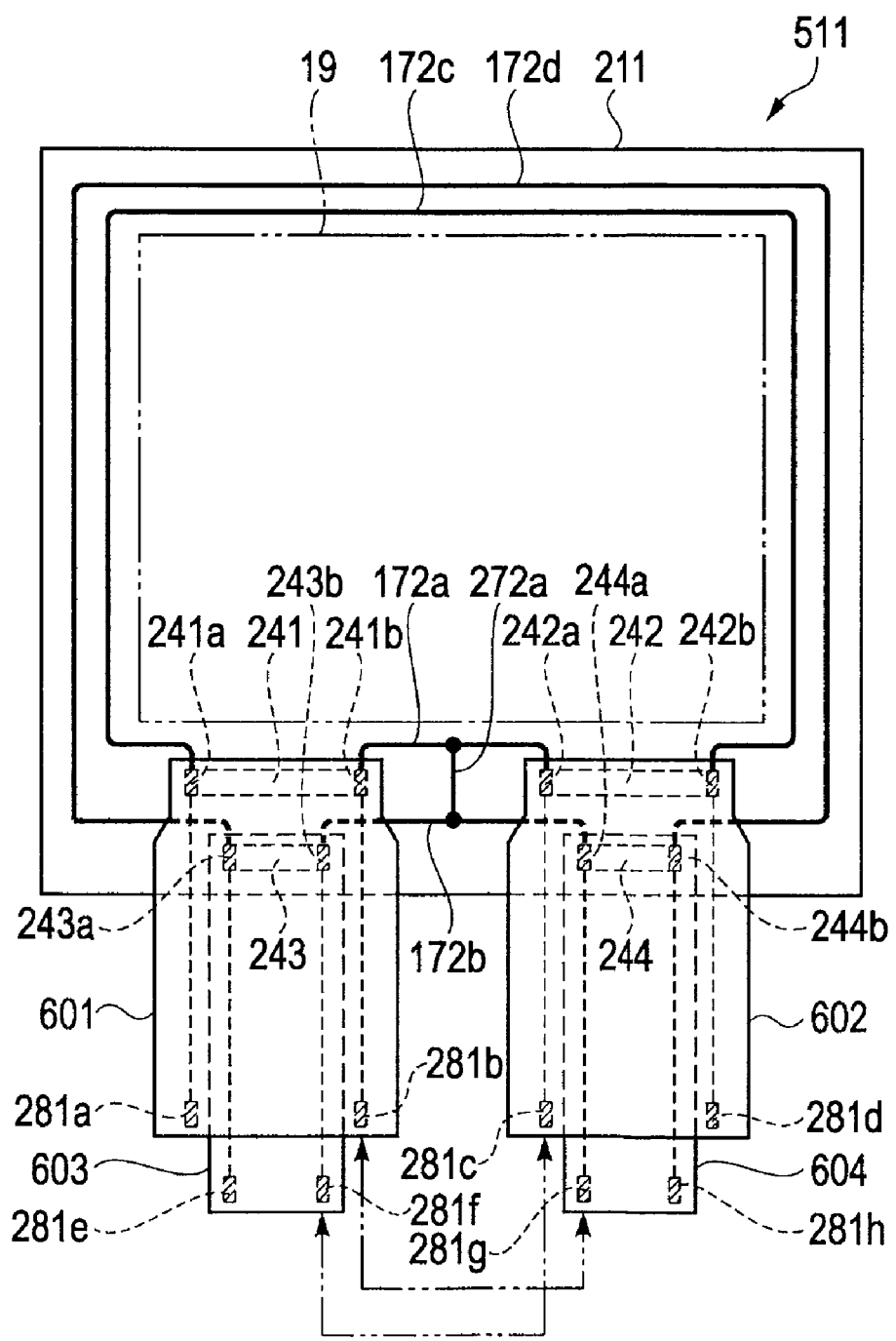
FIG. 18 is a schematic plan view showing the configuration of a liquid crystal device of a modified example.

The invention is not limited to the structure in which the adjacent first panel connection terminal portion 241 and second panel connection terminal portion 242 are connected by the connection wiring 172a and the third panel connection terminal portion 243 and the fourth panel connection terminal portion 244 are connected by the connection wiring 172b as in the third embodiment, the connection over a plurality of layers so as not to cross the wirings (for example, the data lines) extending in the display region 19 may be employed, and, for example, a connection method shown in FIG. 18 may be employed. FIG. 18 is a schematic plan view showing the configuration of a modified example of the liquid crystal device.

As shown in FIG. 18, in a liquid crystal device 511, a second panel terminal 241b and a third panel terminal 242a are electrically connected through a connection wiring 172a. In addition, a sixth panel terminal 243b and a seventh panel terminal 244a are electrically connected through a connection wiring 171b. Further, the connection wirings 172a and 172b are electrically connected through a connection wiring 272a.

By this configuration, the connection between a second external terminal 281b connected to the second panel terminal 241b and a seventh external terminal 281g connected to a seventh panel terminal 244a can be checked. Further, the connection between a third external terminal 281c connected to a third panel terminal 242a and a sixth external terminal 281f connected to a sixth panel terminal 243b can be checked. That is, it is possible to check the connection between the plurality of external terminals, to widen a connection check range, and to specify a non-connection portion.

MODIFIED EXAMPLE 2

Figure 19:
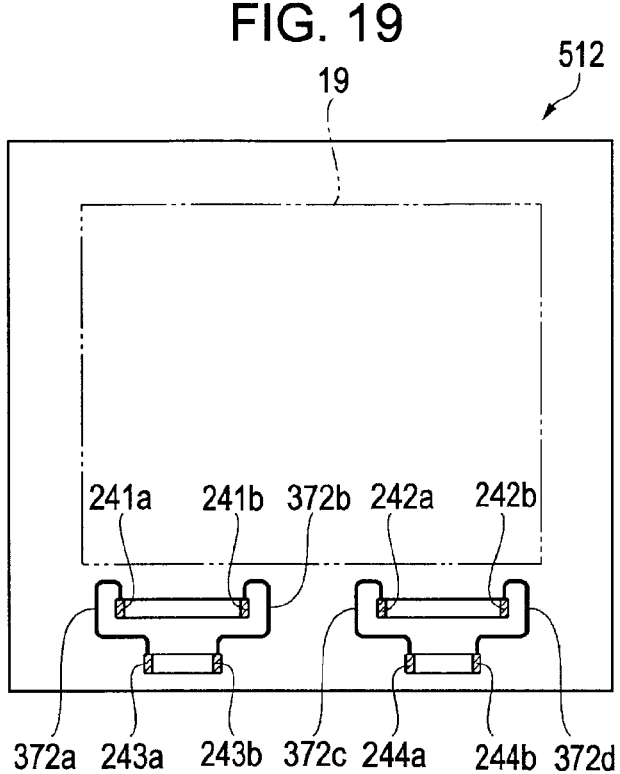
FIG. 19 is a schematic plan view showing the configuration of a liquid crystal device of a modified example.

The invention is not limited to the structure in which the second panel terminal 241b and the third panel terminal 242a horizontally arranged in parallel through the connection wiring 172a or the separated first panel terminal 241a and the fourth panel terminal 242b are connected by extending the connection wiring 172c around the circumference of the display region 19 as in the third embodiment, and for example, a connection method shown in FIG. 19 may be employed. FIG. 19 is a schematic plan view showing the configuration of a modified example of the liquid crystal device.

As shown in FIG. 19, in a liquid crystal device 512, a first panel terminal 241a and a fifth panel terminal 243a which are arranged in the same direction are electrically connected through a connection wiring 372a (fifth connection wiring). A second panel terminal 241b and a sixth panel terminal 243b which are arranged in the same direction are electrically connected through a connection wiring 372b (sixth connection wiring). A third panel terminal 242a and a seventh panel terminal 244a which are arranged in the same direction are electrically connected through a connection wiring 372c. A fourth panel terminal 242b and an eighth panel terminal 244b which are arranged in the same direction are electrically connected through a connection wiring 372d.

By this configuration, even when the connection wiring is not extended around the circumference of the display region 19, it is possible to perform a connection check and to widen the display region 19.

MODIFIED EXAMPLE 3

Figure 20:
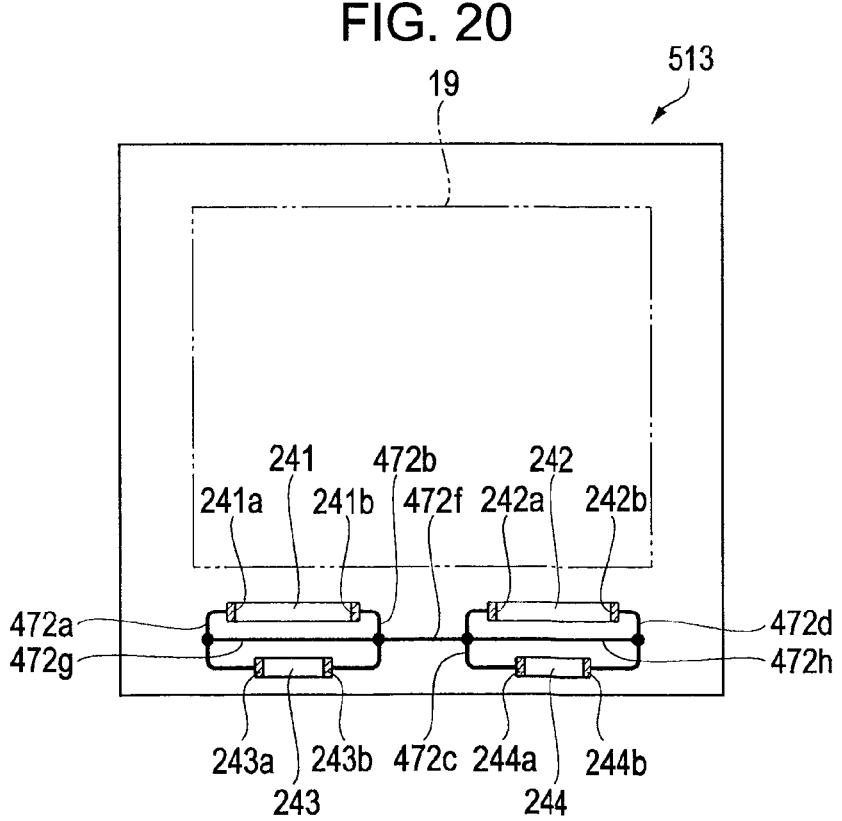
FIG. 20 is a schematic plan view showing the configuration of a liquid crystal device of a modified example.

The invention is not limited to the structure in which the first panel terminal 241a and the fourth panel terminal 242b are connected by the connection wiring 472e extended around the circumference of the display region 19 as in the fourth embodiment. For example, as in a liquid crystal device 513 shown in FIG. 20, a connection wiring 472a and a connection wiring 472b may be connected by a connection wiring 472g passing between a first panel connection terminal portion 241 and a third panel connection terminal portion 243 and a connection wiring 472c and a connection wiring 472d may be connected by a connection wiring 472h passing between a second panel connection terminal portion 242 and a fourth panel connection terminal portion 244, such that the connection between a first panel terminal 241a and a fourth panel terminal 242b can be checked.

In addition, the connection wirings 472 may be connected over a plurality of layers so as not to cross the wirings (for example, the data lines) extending in the display region 19. By this configuration, it is possible to shorten the length of the connection wiring, compared with the method of forming the connection wiring in the circumference of the display region 19.

Figure 21:
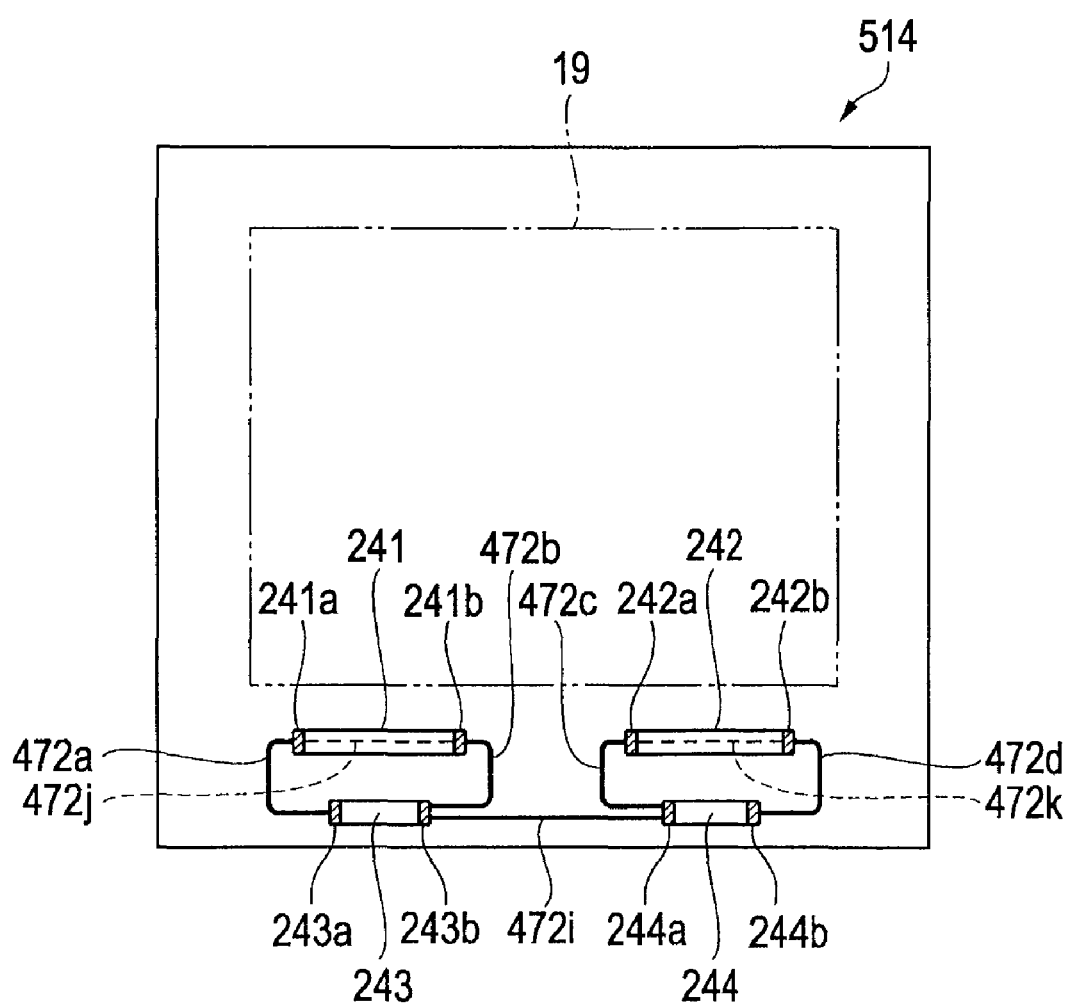
FIG. 21 is a schematic plan view showing the configuration of a liquid crystal device of a modified example.

As in a liquid crystal device 514 shown in FIG. 21, a first panel terminal 241a and a second panel terminal 241b may be electrically connected by a connection wiring 472j passing a lower layer of (directly under) the a first panel connection terminal portion 241, and a third panel terminal 242a and a fourth panel terminal 242b may be electrically connected by a connection wiring 472k passing a lower layer of (directly under) a second panel connection terminal portion 242. In addition, a sixth panel terminal 243b and a seventh panel terminal 244a are electrically connected by a connection wiring 472i. By this configuration, since the connection wirings 472j and 472k are formed on the lower layer of (directly under) the panel connection terminal portions 241 and 242, it is possible to provide the connection wirings without crossing the wirings extending the display region 19.

MODIFIED EXAMPLE 4

As described above, although the driving IC chip 800 is mounted on the flexible substrate 600 (COF: Chip On Film), a flexible substrate on which the driving IC chip 800 is not mounted may be used. In addition, the invention is applicable to Outer Lead Bonding (OLB) or Flexible printed circuit boards On Glass (FOG).

MODIFIED EXAMPLE 5

As described above, instead of the connection of the panel terminals using the connection wirings on the same layer of the liquid crystal panel, for example, a plurality of layers may be formed on the liquid crystal panel and connection wirings are made to creep between the layers using contact holes so as to connect different panel terminals. By this configuration, even the wirings (for example, the data lines) extending in the display region 19 are present, since the connection wirings traverse at different layers, it is possible to perform a connection check without extending the connection wirings around the circumference of the display region 19.

MODIFIED EXAMPLE 6

As described above, the invention is not limited to the structure in which the external terminals are provided in the external connection terminal portions, and, for example, only the external terminals may be extracted between the FPC connection terminal portions and the external connection terminal portions in the flexible substrate. By this configuration, it is possible to easily understand the positions of the external terminals and to easily perform a connection check.

MODIFIED EXAMPLE 7

As described above, although the liquid crystal projector 901 is described as the example of the electronic apparatus, the invention is not limited thereto and may be used in various electronic apparatus such as a high-definition Electric View Finder (EVF), a cellular telephone, a mobile computer, a digital camera, a digital video camera, a television, an in-vehicle apparatus or an audio device. In addition, the invention is not limited to the liquid crystal devices 500, 501, 502 and 503 and is applicable to, for example, an organic EL device, a plasma display, and the like.

The entire disclosure of Japanese Patent Application Nos. 2009-275218, filed Dec. 3, 2009 and 2010-214838, filed Sep. 27, 2010 are expressly incorporated by reference herein.

What is claimed is:

1. An electro-optical device comprising:
an electro-optical panel including:
a first terminal portion having a first group of terminals, the first group of terminals including:
a first terminal; and
a second terminal separated from the first terminal; and
a second terminal portion arranged adjacent to the first terminal portion and having a second group of terminals, the having second group of terminals including:
a third terminal; and
a fourth terminal separated from the third terminal, the first terminal and the fourth terminal being electrically connected through a first connection wiring provided on the electro-optical panel, the second terminal and the third terminal being electrically connected through a second connection wiring provided on the electro-optical panel;
a first circuit substrate including:
a first connection terminal portion having a first group of connection terminals to be electrically connected to the first terminal portion;
a first external terminal connected to the first terminal through the first connection terminal portion; and
a second external terminal connected to the second terminal through the first connection terminal portion; and
a second circuit substrate including:
a second connection terminal portion having a second group of connection terminals to be electrically connected to the second terminal portion;
a third external terminal electrically connected to the third terminal through the second connection terminal portion; and
a fourth external terminal electrically connected to the fourth terminal through the second connection terminal portion.

2. The electro-optical device according to claim 1, wherein some of the first connection wiring and the second connection wiring is arranged so as to be extended around the circumference of a display region.

3. The electro-optical device according to claim 1, wherein:
each of the first and second group of terminals configures a terminal group arranged in a predetermined direction, and
the first terminal and the second terminal, and the third terminal and the fourth terminal are provided at both end sides of the predetermined direction of the terminal group.

4. The electro-optical device according to claim 1, wherein the first terminal portion and the second terminal portion are provided on at least one of a first side of the electro-optical panel and a second side of a direction crossing the first side.

5. The electro-optical device according to claim 1, wherein:
the electro-optical panel includes a third terminal portion having a third group of terminals, a fourth terminal portion having a fourth group of terminals arranged so as to be adjacent to the third terminal portion, a third circuit substrate on which a third connection terminal portion having a third group of connection terminals to be electrically connected to the third terminal portion is provided, and a fourth circuit substrate on which a fourth connection terminal portion having a fourth group of connection terminals to be electrically connected to the fourth terminal portion is provided, the third terminal portion is provided between a position where the first terminal portion is provided and an end of the electro-optical panel, and the fourth terminal portion is provided between a position where the second terminal portion is provided and an end of the electro-optical panel, the third group of terminals has fifth and sixth terminals separated from each other, the fourth group of terminals has seventh and eighth terminals separated from each other, and the fifth terminal and the eighth terminal, and the sixth terminal and the seventh terminal are electrically connected through a third connection wiring and a fourth connection wiring provided on the electro-optical panel, respectively, the third circuit substrate has a fifth external terminal electrically connected to the fifth terminal through the third connection terminal portion and a sixth external terminal electrically connected to the sixth terminal, and the fourth circuit substrate has a seventh external terminal electrically connected to the seventh terminal through the fourth connection terminal portion and an eighth external terminal electrically connected to the eighth terminal.

6. The electro-optical device according to claim 5, wherein the third connection wiring is extended around the circumference of the display region.

7. The electro-optical device according to claim 5, wherein:
each of the third and fourth group of terminals configures a terminal group arranged in a predetermined direction, and
the fifth terminal and the sixth terminal, and the seventh terminal and the eighth terminal are provided at both end sides of the predetermined direction of the terminal group.

8. An electro-optical device comprising:
an electro-optical panel including:
a first terminal portion having a first group of terminals, the first group of terminals including:
a first terminal; and
a second terminal separated from the first terminal; and
a third terminal portion arranged on a side opposed to a display region with respect to the first terminal portion, the third terminal portion having a third group of terminals, the third group of terminals including:
a fifth terminal; and
a sixth terminal separated from the fifth terminal, the first terminal and the fifth terminal being electrically connected through a fifth connection wiring provided on the electro-optical panel, the second terminal and the sixth terminal being electrically connected through a sixth connection wiring provided on the electro-optical panel;
a first circuit substrate including:
a first connection terminal portion having a first group of connection terminals to be electrically connected to the first terminal portion;
a first external terminal connected to the first terminal through the first connection terminal portion; and
a second external terminal connected to the second terminal through the first connection terminal portion respectively; and
a third circuit substrate including:
a third connection terminal portion having a third group of connection terminals to be electrically connected to the third terminal portion;
a fifth external terminal electrically connected to the fifth terminal through the third connection terminal portion; and
a sixth external terminal electrically connected to the sixth terminal through the third connection terminal portion.

9. The electro-optical device according to claim 8, wherein the fifth connection wiring and the sixth connection wiring are provided at an end side of the electro-optical panel rather than the display region.

10. The electro-optical device according to claim 8, wherein:
each of the first and third group of terminals configures a terminal group arranged in a predetermined direction, and
the first terminal and the second terminal, and the fifth terminal and the sixth terminal are provided at both end sides of the predetermined direction of the terminal group.

11. An electro-optical panel comprising:
a substrate;
a first terminal portion including a first group of terminals having a first terminal and a second terminal separated from each other;
a second terminal portion arranged adjacent to the first terminal portion, the second terminal portion including a second group of terminals having a third terminal and a fourth terminal separated from each other;
a third terminal portion arranged between one side of the substrate and the first terminal portion, the third terminal portion including a third group of terminals having a fifth terminal and a sixth terminal separated from each other;
a fourth terminal portion arranged between one side of the substrate and the second terminal portion, the fourth terminal portion including a fourth group of terminals having a seventh terminal and a eighth terminal separated from each other;
a first connection wiring configured to electrically connect the first terminal and the fourth terminal;
a fifth connection wiring configured to electrically connect the first terminal and the fifth terminal;
a sixth connection wiring configured to electrically connect the second terminal and the sixth terminal;
a seventh connection wiring configured to electrically connect the third terminal and the seventh terminal;
an eighth connection wiring configured to electrically connect the fourth terminal and the eighth terminal; and
a ninth connection wiring configured to electrically connect the sixth connection wiring and the seventh connection wiring so as to electrically connect the second terminal, the third terminal, the sixth terminal and the seventh terminal.

12. An electro-optical device comprising:
the electro-optical panel according to claim 11;
a first circuit substrate on which a first connection terminal portion having a first group of connection terminals to be electrically connected to the first terminal portion is provided and which has a first external terminal connected to the first terminal through the first connection terminal portion and a second external terminal connected to the second terminal;

a second circuit substrate on which a second connection terminal portion having a second group of connection terminals to be electrically connected to the second terminal portion is provided and which has a third external terminal connected to the third terminal through the second connection terminal portion and a fourth external terminal connected to the fourth terminal;

a third circuit substrate on which a third connection terminal portion having a third group of connection terminals to be electrically connected to the third terminal portion is provided and which has a fifth external terminal connected to the fifth terminal through the third connection terminal portion and a sixth external terminal connected to the sixth terminal; and a fourth circuit substrate on which a fourth connection terminal portion having a fourth group of connection terminals to be electrically connected to the fourth terminal portion is provided and which has a seventh external terminal connected to the seventh terminal through the fourth connection terminal portion and an eighth external terminal connected to the eighth terminal.

13. An electronic apparatus comprising the electro-optical device according to claim 1.

* * * * *